US010219279B2

(12) United States Patent
Baghel et al.

(10) Patent No.: US 10,219,279 B2
(45) Date of Patent: Feb. 26, 2019

(54) SIGNALING TO REQUEST INCREASED TRANSMISSION POWER LIMIT IN AN EMERGENCY

(71) Applicant: QUALCOMM Incorporated, San Diego, CA (US)

(72) Inventors: Sudhir Kumar Baghel, Bridgewater, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 14/991,845

(22) Filed: Jan. 8, 2016

(65) Prior Publication Data

US 2016/0205525 A1 Jul. 14, 2016

Related U.S. Application Data

(60) Provisional application No. 62/103,537, filed on Jan. 14, 2015.

(51) Int. Cl.
*H04W 72/04* (2009.01)
*H04W 52/38* (2009.01)
(Continued)

(52) U.S. Cl.
CPC ......... *H04W 72/0473* (2013.01); *H04W 4/90* (2018.02); *H04W 52/281* (2013.01);
(Continued)

(58) Field of Classification Search
CPC .......................... H04W 52/383; H04W 76/043
See application file for complete search history.

(56) References Cited

U.S. PATENT DOCUMENTS

| 2013/0148637 A1* | 6/2013 | Yang | H04W 72/042 370/336 |
| 2014/0003262 A1* | 1/2014 | He | H04W 28/08 370/252 |

(Continued)

FOREIGN PATENT DOCUMENTS

WO     2014046576 A1    3/2014

OTHER PUBLICATIONS

Asustek: "Issue on ProSe-BSR Associated with Multiple Groups", 3GPP Draft, R2-144266 Issue on ProSe-BSR Associated with Multiple Groups, 3rd Generation Partnership Project (3GPP), Mobile Competence Centre, 650, Route Des Lucioles, F-06921 Sophia-Antipolis Cedex, vol. RAN WG2, No. Shanghai, China, 20141006-20141010 Sep. 26, 2014 (Sep. 26, 2014), 6 pages, XP050870236, Retrieved from the Internet: URL: http://www.3gpp.org/ftp/tsg_ran/ WG2_RL2/TSGR2_87bis/Docs/ [retrieved on Sep. 26, 2014] table 1.

(Continued)

*Primary Examiner* — Mansour Oveissi
(74) *Attorney, Agent, or Firm* — Arent Fox, LLP

(57) ABSTRACT

A method, an apparatus, and a computer-readable medium for wireless communication are provided. The apparatus may be a UE. The UE transmits a message to a base station. The message includes a status of the UE. The UE receives a DCI message from the base station based on the status. The DCI message includes transmit power control information for D2D communications. The transmit power control information indicates whether the UE can transmit at an allowed transmit power. The UE transmits data based on the transmit power control information received in the DCI message.

26 Claims, 14 Drawing Sheets

(51) Int. Cl.
*H04W 52/28* (2009.01)
*H04W 4/90* (2018.01)
*H04W 76/14* (2018.01)

(52) U.S. Cl.
CPC ......... *H04W 52/38* (2013.01); *H04W 52/383* (2013.01); *H04W 72/042* (2013.01); *H04W 76/14* (2018.02)

(56) References Cited

U.S. PATENT DOCUMENTS

2014/0056220 A1   2/2014   Poitau et al.
2014/0078971 A1*  3/2014   Bontu .................. H04W 8/005
                                                          370/329
2017/0171690 A1*  6/2017   Kim ....................... H04W 4/00

OTHER PUBLICATIONS

International Search Report and Written Opinion—PCT/US2016/012905—ISA/EPO—dated Apr. 5, 2016.

\* cited by examiner

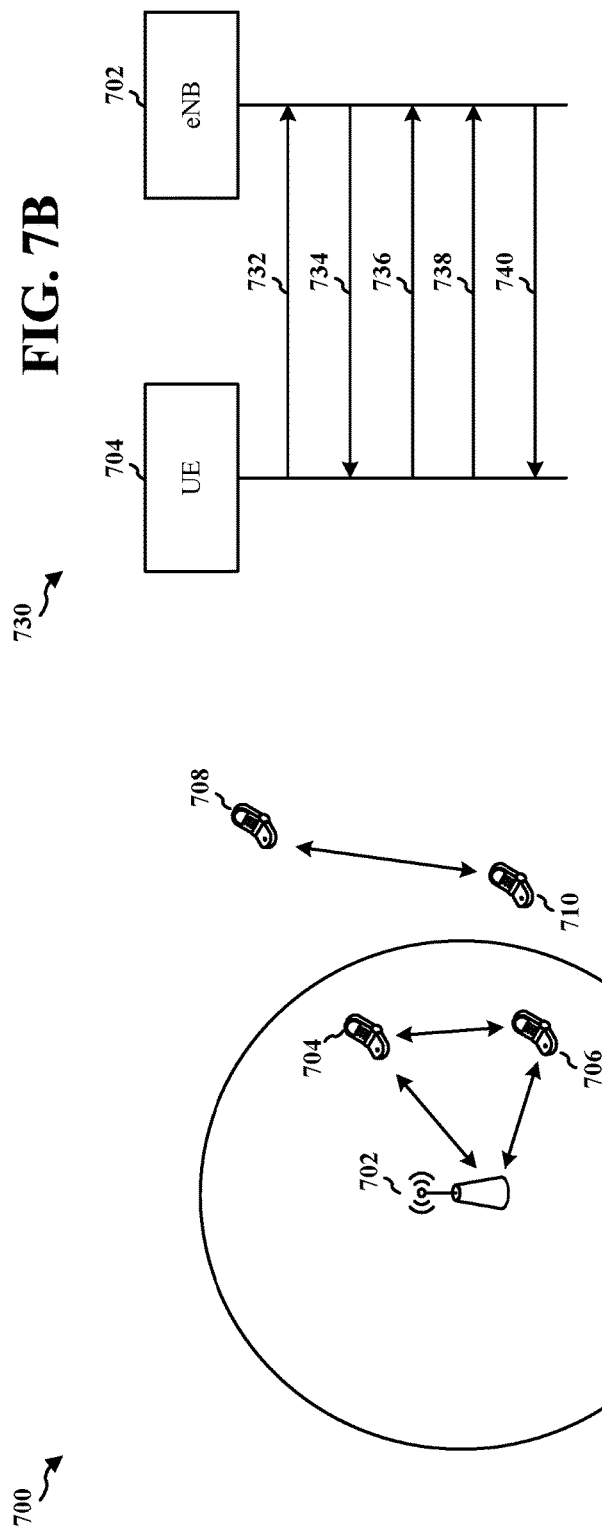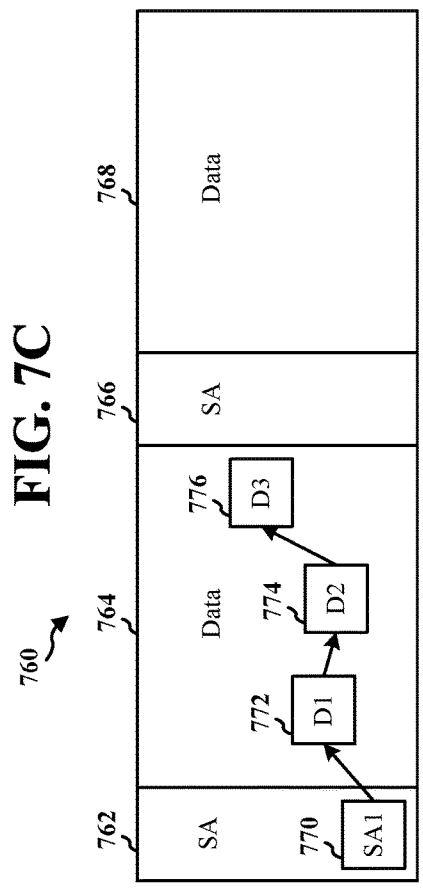
FIG. 7B
FIG. 7C
FIG. 7A
Device-to-Device
Communications System

SIGNALING TO REQUEST INCREASED TRANSMISSION POWER LIMIT IN AN EMERGENCY

CROSS-REFERENCE TO RELATED APPLICATION(S)

This application claims the benefit of U.S. Provisional Application Ser. No. 62/103,537, entitled "SIGNALING TO REQUEST INCREASED TRANSMISSION POWER LIMIT IN AN EMERGENCY" and filed on Jan. 14, 2015, which is expressly incorporated by reference herein in its entirety.

BACKGROUND

Field

The present disclosure relates generally to communication systems, and more particularly, to signaling to request an increased transmission power limit in an emergency situation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus may be a user equipment (UE). The apparatus transmits a message to a base station. The message includes a status of the apparatus. The apparatus receives a downlink control information (DCI) message from the base station based on the status. The DCI message includes transmit power control information for device-to-device (D2D) communications. The transmit power control information indicates whether the apparatus can transmit at an allowed transmit power. The apparatus transmits data based on the transmit power control information received in the DCI message.

In another aspect of the disclosure, a method, a computer-readable medium, and an apparatus are provided. The apparatus may be a base station. The apparatus receives a message from a UE. The message indicates a status of the UE. The apparatus determines transmit power control information for the UE based on the status. The apparatus transmits a DCI message to the UE. The DCI message includes the transmit power control information for D2D communications. The transmit power control information indicates whether the UE can transmit at an allowed transmit power.

In another aspect, a method of wireless communication by a base station is provided. The method may include receiving a message from a UE, in which the message indicates a status of the UE, determining transmit power control information for the UE based on the status, and transmitting a DCI message to the UE. The DCI message may include the transmit power control information for D2D communications, and the transmit power control information may indicate whether the UE can transmit at an allowed transmit power. In an aspect, the status may be an emergency status that indicates whether the UE is in an emergency situation. In another aspect, the allowed transmit power may include one of a maximum transmission power of the UE, a designated transmission power, or an allowed transmission power range. In another aspect, the message may include a requested transmit power to be used by the UE for transmitting data to at least one D2D group based on the status of the UE. In another aspect, the DCI message may indicate at least one D2D group to which data is to be transmitted by the UE at the allowed transmit power. In another aspect, the message may indicate an intention to perform D2D communications. In another aspect, the message may indicate at least one D2D group with which the UE intends to communicate based on the status of the UE. In another configuration, the method may include transmitting a configuration message based on the status, and the configuration message may indicate the allowed transmit power for at least one D2D group associated with the UE. In another aspect, the allowed transmit power may be different from the requested transmit power. In another aspect, the message may include a buffer status report and a D2D group index. The D2D group index may be associated with a D2D group identifier and may correspond to a position of the D2D group identifier included in a direct communication indication message received from the UE. The D2D group identifier may be associated with a D2D group with which the UE intends to communicate based on the status of the UE. In another configuration, the method may include transmitting information to the UE. The information may indicate a maximum transmission power for at least one of a frequency band, a type of UE, or a service subscription, the maximum transmission power being equal to the allowed transmit power. In an aspect, the information may be transmitted in a system information block or in a dedicated message. In another aspect, the message may include at least one of a requested transmit power, a base station identifier, a D2D group identifier, a status start time, or a status stop time. In another configuration, the method may include transmitting information included in the received message from the UE to a second base station in a handover procedure. The information may include the status of the UE, the transmit power control information, and at least one of a D2D group identifier or a D2D group index associated with a D2D group with which the UE intends to communicate based on the status of the UE.

In another aspect, an apparatus for wireless communication is provided. The apparatus may include means for receiving a message from a UE. The message may indicate a status of the UE. The apparatus may include means for determining transmit power control information for the UE based on the status and means for transmitting a DCI message to the UE. The DCI message may include the transmit power control information for D2D communications, and the transmit power control information may indicate whether the UE can transmit at an allowed transmit power. In another aspect, the status may be an emergency status that indicates whether the UE is in an emergency situation. In yet another aspect, the allowed transmit power may include one of a maximum transmission power of the UE, a designated transmission power, or an allowed transmission power range. In another aspect, the message may include a requested transmit power to be used by the UE for transmitting data to at least one D2D group based on the status of the UE. In yet another aspect, the DCI message may indicate at least one D2D group to which data is to be transmitted by the UE at the allowed transmit power. In another aspect, the message may indicate an intention to perform D2D communications. In another aspect, the message may indicate at least one D2D group with which the UE intends to communicate based on the status of the UE. In another configuration, the apparatus may include means for transmitting a configuration message based on the status, and the configuration message may indicate the allowed transmit power for at least one D2D group associated with the UE. In another aspect, the allowed transmit power may be different from the requested transmit power. In another aspect, the message may include a buffer status report and a D2D group index. The D2D group index may be associated with a D2D group identifier and may correspond to a position of the D2D group identifier included in a direct communication indication message received from the UE. The D2D group identifier may be associated with a D2D group with which the UE intends to communicate based on the status of the UE. In another configuration, the apparatus may include means for transmitting information to the UE. The information may indicate a maximum transmission power for at least one of a frequency band, a type of UE, or a service subscription. The maximum transmission power may be equal to the allowed transmit power. In another aspect, the information may be transmitted in a system information block or in a dedicated message. In another aspect, the message may include at least one of a requested transmit power, a base station identifier, a D2D group identifier, a status start time, or a status stop time. In another configuration, the apparatus may include means for transmitting information included in the received message from the UE to a second base station in a handover procedure. The information may include the status of the UE, the transmit power control information, and at least one of a D2D group identifier or a D2D group index associated with a D2D group with which the UE intends to communicate based on the status of the UE.

In another aspect, an apparatus for wireless communication is provided. The apparatus may include a memory and at least one processor coupled to the memory. The at least one processor may be configured to receive a message from a UE, and the message may indicate a status of the UE. The at least one processor may be configured to determine transmit power control information for the UE based on the status and to transmit a DCI message to the UE. The DCI message may include the transmit power control information for D2D communications. The transmit power control information may indicate whether the UE can transmit at an allowed transmit power. In an aspect, the status may be an emergency status that indicates whether the UE is in an emergency situation. In another aspect, the allowed transmit power may include one of a maximum transmission power of the UE, a designated transmission power, or an allowed transmission power range. In another aspect, the message may include a requested transmit power to be used by the UE for transmitting data to at least one D2D group based on the status of the UE. In another aspect, the DCI message may indicate at least one D2D group to which data is to be transmitted by the UE at the allowed transmit power. In another aspect, the message may indicate an intention to perform D2D communications. In another aspect, the message may indicate at least one D2D group with which the UE intends to communicate based on the status of the UE. In another configuration, the at least one processor may be further configured to transmit a configuration message based on the status. The configuration message may indicate the allowed transmit power for at least one D2D group associated with the UE. In another aspect, the allowed transmit power may be different from the requested transmit power. In another aspect, the message may include a buffer status report and a D2D group index. The D2D group index may be associated with a D2D group identifier and may correspond to a position of the D2D group identifier included in a direct communication indication message received from the UE. The D2D group identifier may be associated with a D2D group with which the UE intends to communicate based on the status of the UE. In another configuration, the at least one processor may be further configured to transmit information to the UE. The information may indicate a maximum transmission power for at least one of a frequency band, a type of UE, or a service subscription. The maximum transmission power may be equal to the allowed transmit power. In another aspect, the information may be transmitted in a system information block or in a dedicated message. In another aspect, the message may include at least one of a requested transmit power, a base station identifier, a D2D group identifier, a status start time, or a status stop time. In another configuration, the at least one processor may be further configured to transmit information included in the received message from the UE to a second base station in a handover procedure. The information may include the status of the UE, the transmit power control information, and at least one of a D2D group identifier or a D2D group index associated with a D2D group with which the UE intends to communicate based on the status of the UE.

In another aspect, a computer-readable medium of a base station storing computer executable code for wireless communication is provided. The computer-readable medium may include code for receiving a message from a UE, in which the message indicates a status of the UE, code for determining transmit power control information for the UE based on the status, and code for transmitting a downlink control information (DCI) message to the UE, wherein the DCI message includes the transmit power control information for D2D communications. The transmit power control information may indicate whether the UE can transmit at an allowed transmit power. In an aspect, the status may be an emergency status that indicates whether the UE is in an emergency situation. In another aspect, the allowed transmit power may include one of a maximum transmission power of the UE, a designated transmission power, or an allowed transmission power range. In another aspect, the message may include a requested transmit power to be used by the UE for transmitting data to at least one D2D group based on the status of the UE. In another aspect, the DCI message may indicate at least one D2D group to which data is to be transmitted by the UE at the allowed transmit power. In another aspect, the message may indicate an intention to perform D2D communications. In another aspect, the message may indicate at least one D2D group with which the UE intends to communicate based on the status of the UE. In another configuration, the computer-readable medium may further include code for transmitting a configuration message based on the status. The configuration message may indicate the allowed transmit power for at least one D2D group associated with the UE. In another aspect, the allowed transmit power may be different from the requested transmit power. In another aspect, the message may include a buffer status report and a D2D group index. The D2D group index may be associated with a D2D group identifier and may correspond to a position of the D2D group identifier included in a direct communication indication message received from the UE. The D2D group identifier may be associated with a D2D group with which the UE intends to communicate based on the status of the UE. In another configuration, the computer-readable medium may further include code for transmitting information to the UE. The information may indicate a maximum transmission power for at least one of a frequency band, a type of UE, or a service subscription. The maximum transmission power may be equal to the allowed transmit power. In another aspect, the information may be transmitted in a system information block or in a dedicated message. In another aspect, the message may include at least one of a requested transmit power, a base station identifier, a D2D group identifier, a status start time, or a status stop time. In another configuration, the computer-readable medium may further include code for transmitting information included in the received message from the UE to a second base station in a handover procedure. The information may include the status of the UE, the transmit power control information, and at least one of a D2D group identifier or a D2D group index associated with a D2D group with which the UE intends to communicate based on the status of the UE.

BRIEF DESCRIPTION OF THE DRAWINGS

FIGS. 7A-C are diagrams of a device-to-device communications system performing device-to-device communication.

DETAILED DESCRIPTION

Figure 1:
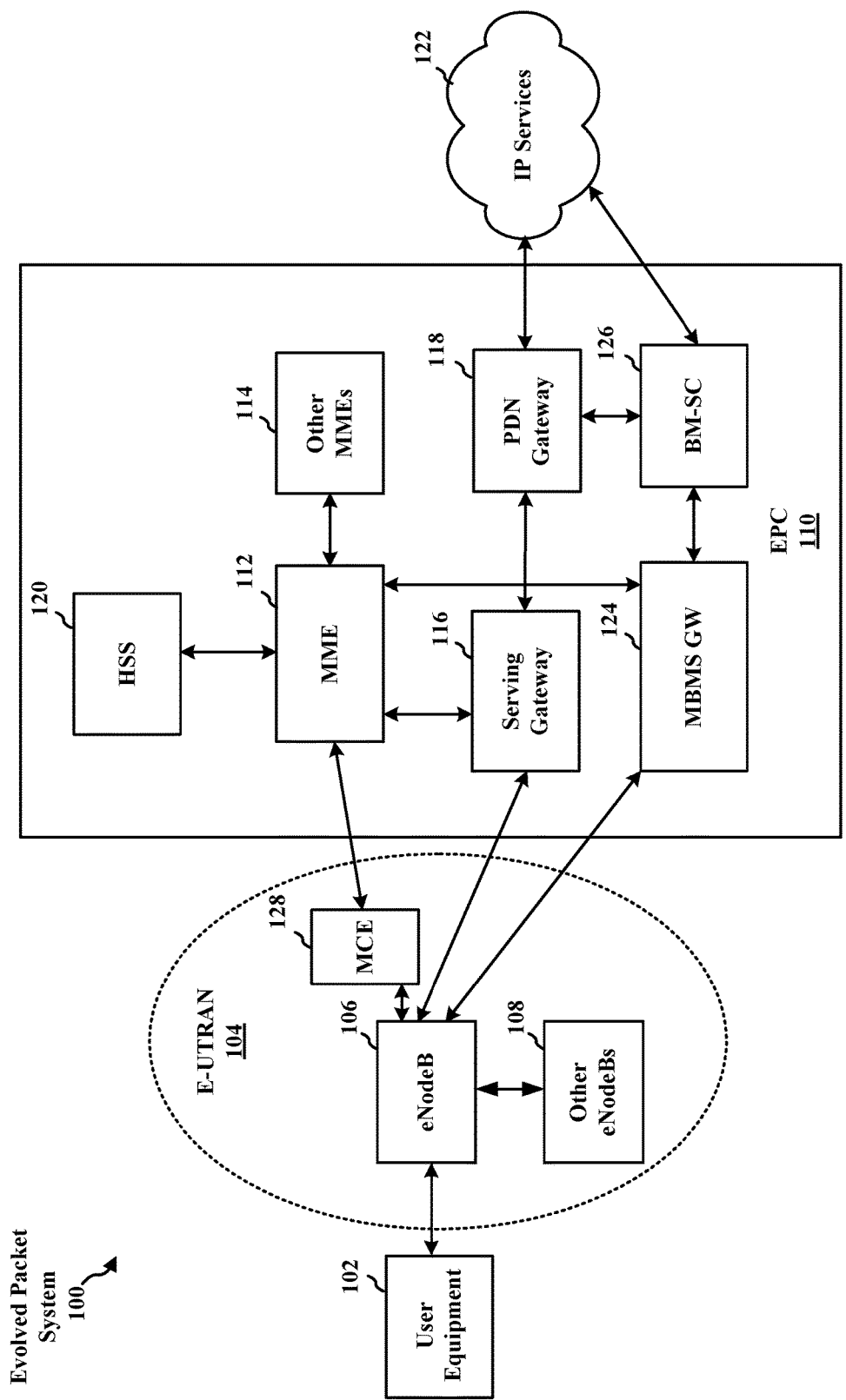
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMES 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
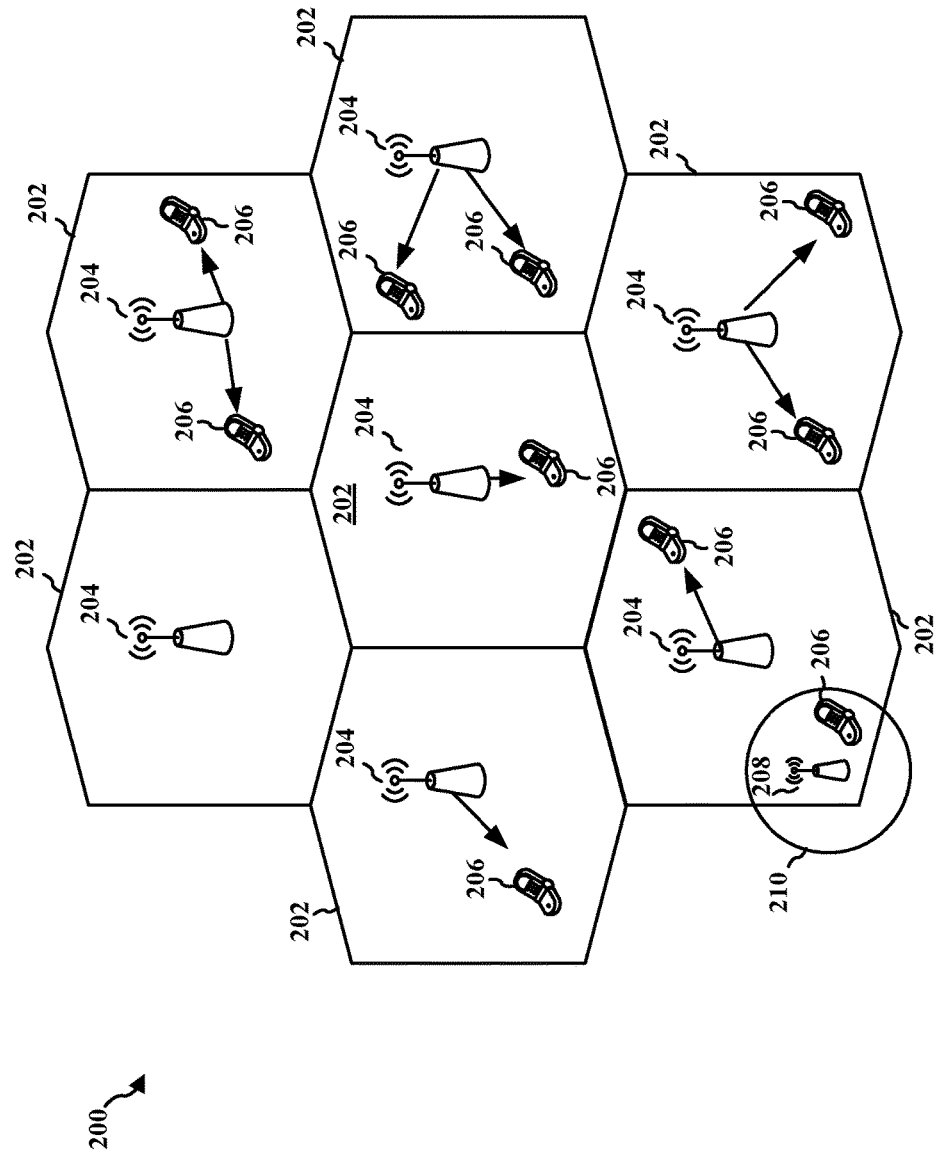
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
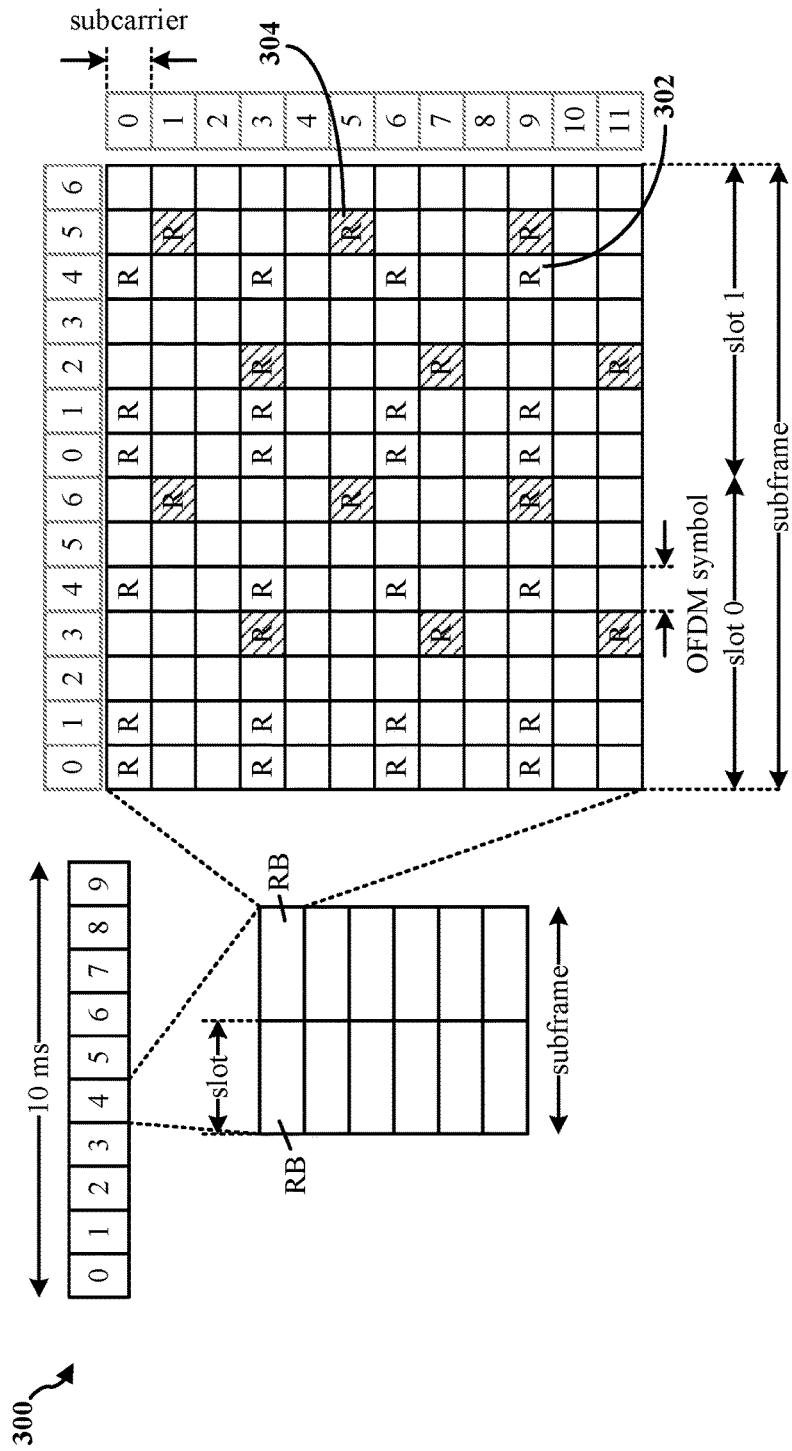
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
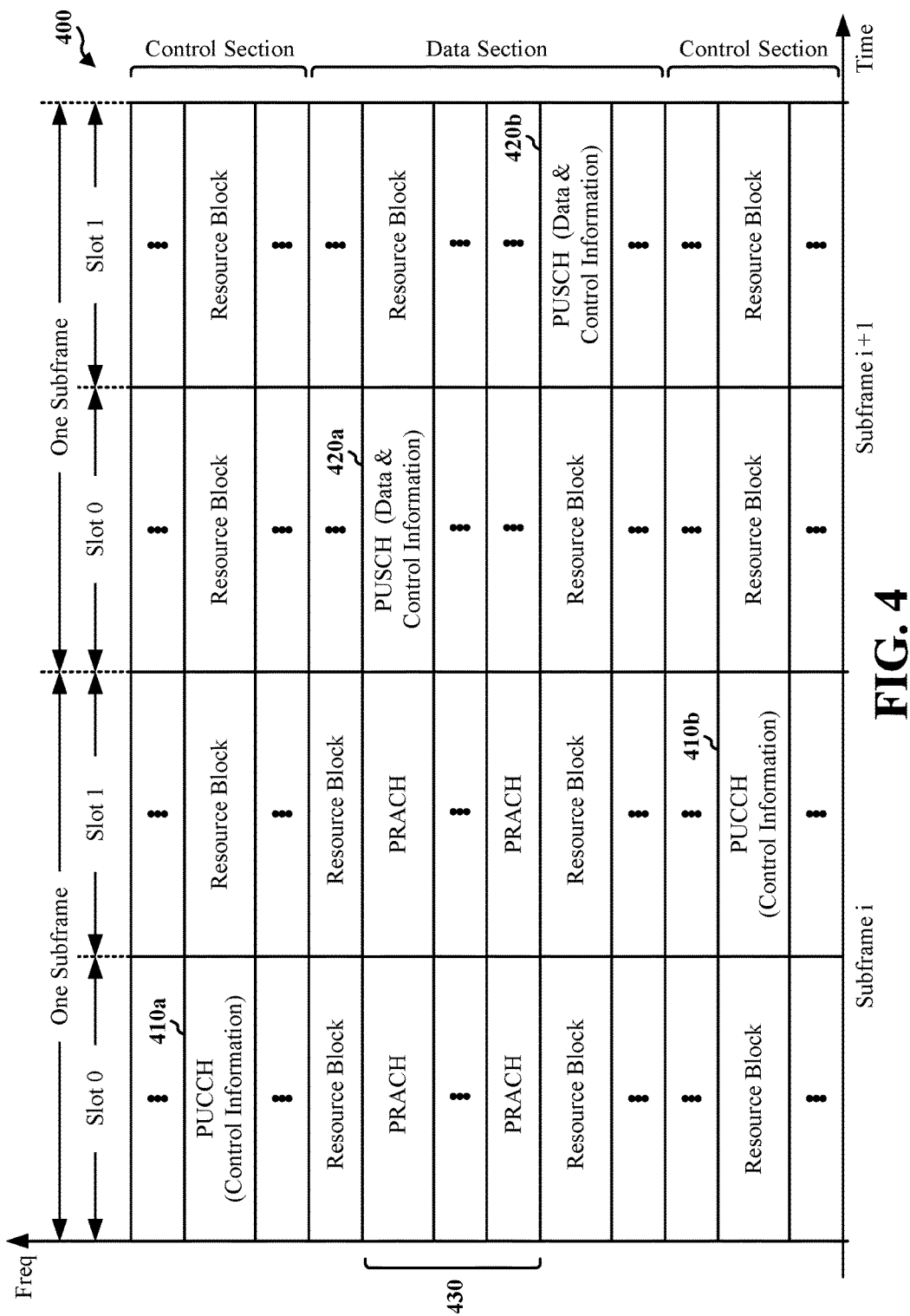
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
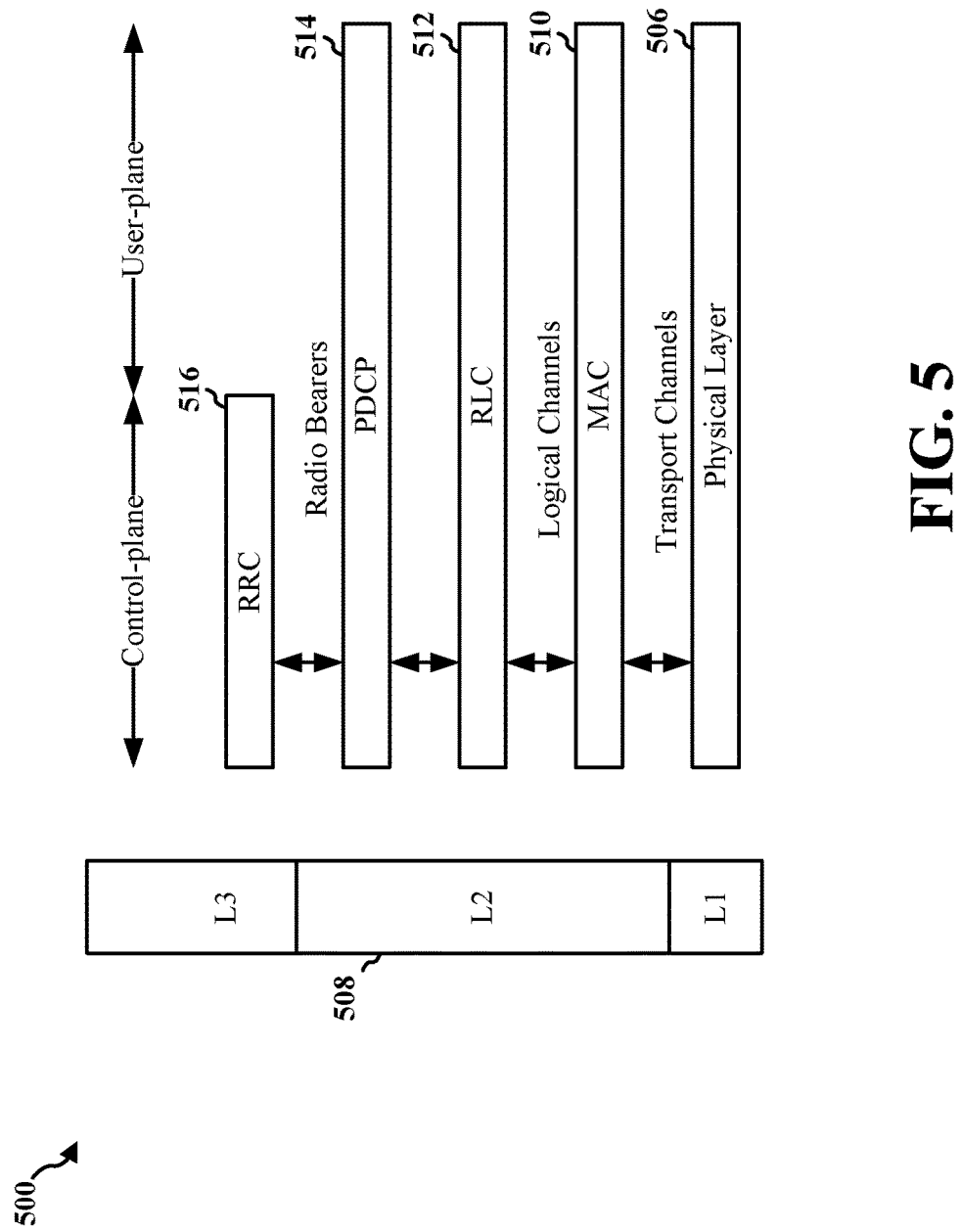
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
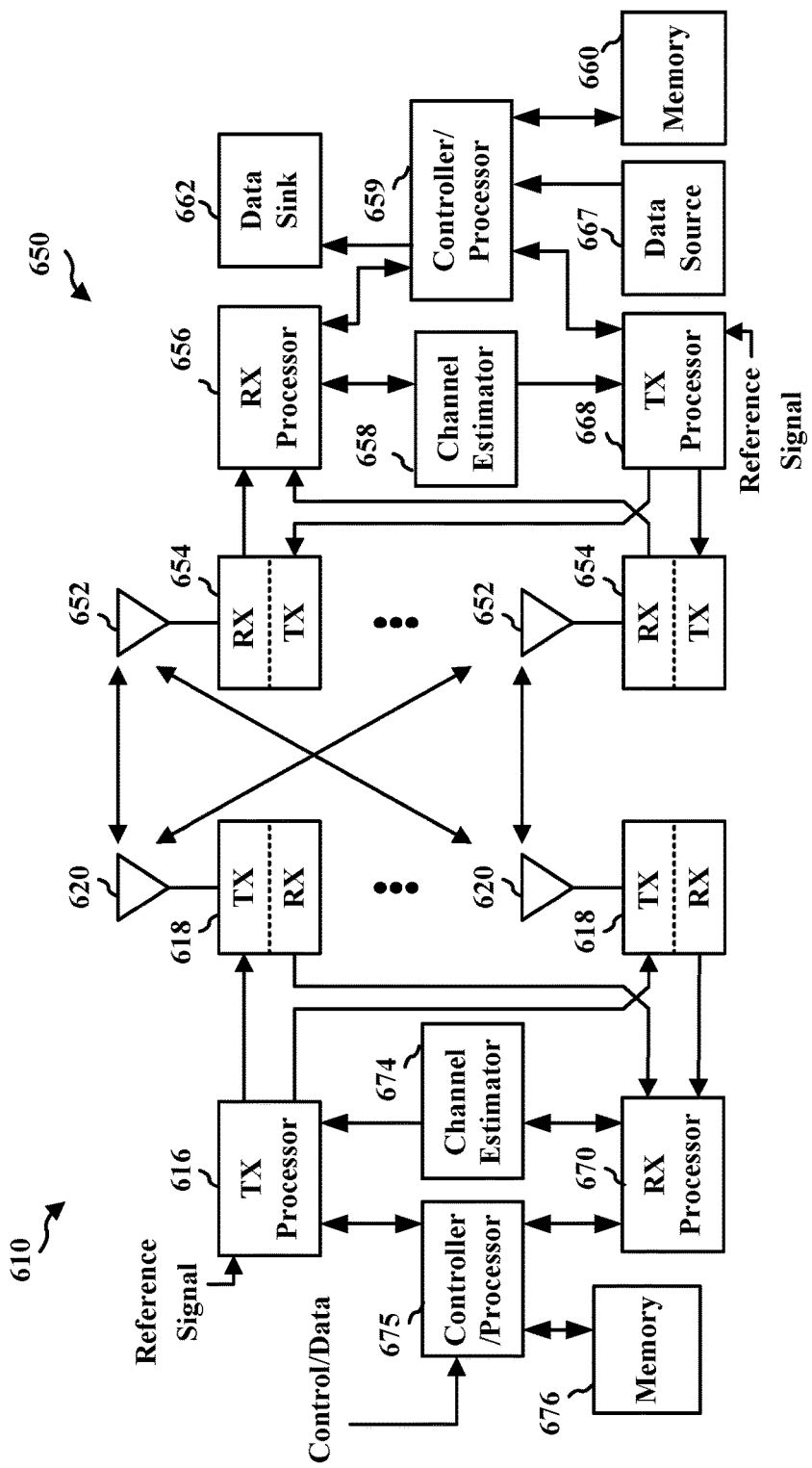
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

FIGS. 7A-C are diagrams of a device-to-device communications system 700 performing device-to-device communication. Referring to FIG. 7A, the device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with a base station 702, and some may do both. For example, as shown in FIG. 7A, the wireless devices 708, 710 are in device-to-device communication and the wireless devices 704, 706 are in device-to-device communication. The wireless devices 704, 706 are also communicating with the base station 702.

The exemplary methods and apparatuses discussed below are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

FIG. 7B illustrates a call flow diagram 730 in which a wireless device may request resources for D2D communication. Referring to the call flow diagram 730, when the wireless device 704 wants to initiate D2D communications with the wireless device 706, for example, the wireless device 704 may transmit a ProSeUEInformation message 732 to the base station 702 (e.g., ProSe may refer to Proximity Services). The ProSeUEInformation message 732 may indicate that the wireless device 704 wants to initiate D2D communications and may include a request for resources. The ProSeUEInformation message 732 may also include one or more identifiers (IDs) associated with another wireless device or a group of wireless devices with which the wireless device 704 intends to communicate. In an aspect, the ProSeUEInformation message 732 may be an RRC message. In response, the base station 702 may transmit an RRCConnectionReconfiguration message 734 to the wireless device 704. The RRCConnectionReconfiguration message 734 may indicate a pool or group of wireless resources that may be allocated to the wireless device 704 by including Mode 1/Mode 2 information (e.g., time-frequency information of a wireless resource pool). The RRCConnectionReconfiguration message 734 may also include a D2D radio network temporary identifier (e.g., a side link radio network temporary identifier (SL-RNTI)). Upon successfully receiving the RRCConnectionReconfiguration message 734, the wireless device 704 may transmit a RRCConnectionReconfigurationComplete message 736 to the base station 702 to indicate that the successful reception. In an aspect, when the wireless device 704 is in Mode 1 operation and has data to transmit to the wireless device 706, the wireless device 704 may request resources by transmitting a ProSe BufferStatusReport (BSR) message 738 to the base station 702. In response, the base station 702 may transmit a downlink control information (DCI) message 740 to the wireless device 704. The DCI message 740 may indicate wireless resources allocated to the wireless device 704 based on the ProSe BSR message 738. For example, the DCI message 740 may identify a subset of resources within the pool of resources indicated in the RRCConnectionReconfiguration message 734. In an aspect, the DCI message 740 may include a cyclic redundancy check (CRC) that is scrambled with or encoded based on the SL-RNTI. The wireless device 704 may identify/determine which DCI message is intended for the wireless device 704 based on the SL-RNTI received in the RRCConnectionReconfiguration message 734. In another aspect, when the wireless device 704 is in Mode 2 operation, the wireless device 704 may select a specific resource from the resource pool provided in the RRCConnectionReconfiguration message 734 without receiving a DCI message from the eNB. In this aspect, the wireless device 704 also may not transmit a ProSe BSR message for purposes of receiving the DCI message.

FIG. 7C illustrates a diagram 760 for D2D communication. The diagram 760 includes scheduling assignment (SA) slots 762, 766 for transmitting scheduling assignment information. The diagram 760 also includes data slots 764, 768 for transmitting data in D2D communications. After the wireless device 704 determines the allocated wireless resources for D2D communication from the DCI message 740, the wireless device 704 may transmit a scheduling assignment message 770 that includes a UE ID or D2D group ID. The UE ID or D2D group ID indicates the intended recipient of the data in the D2D communication. The scheduling assignment message 770 also includes information identifying the time-frequency resources in which the data 772, 774, 776 is located. For example, if the wireless device 706 is associated with a D2D group having a D2D group ID 2 and the wireless device 704 wants to transmit data to D2D group ID 2, the scheduling assignment message 770 may include a D2D group ID 2 and location information on the wireless resources for transmitting data 772, 774, 776. When wireless device 706 and other wireless devices associated with the D2D group ID 2 receive the scheduling assignment message 770 that includes the D2D group ID 2, the wireless device 706 and the other wireless devices will know where to retrieve the data transmitted by the wireless device 704 based on the location information in the scheduling assignment message 770.

In some instances, wireless devices (e.g., the wireless device 704) may be used in emergency situations. For example, police officers and firefighters may use wireless devices during a fire rescue to communicate the status of the fire and of any individuals trapped within a burning structure. Police officers may use wireless devices to engage in D2D communication with groups of firefighters, medical personnel, and other public safety personnel to provide information about the scene, and vice versa. Communications between groups of public safety personnel may be critical in emergency situations. To increase the reliability of such communications, wireless devices may be able to request for and receive increased transmission power for purposes of transmitting data during an emergency situation.

Figure 8:
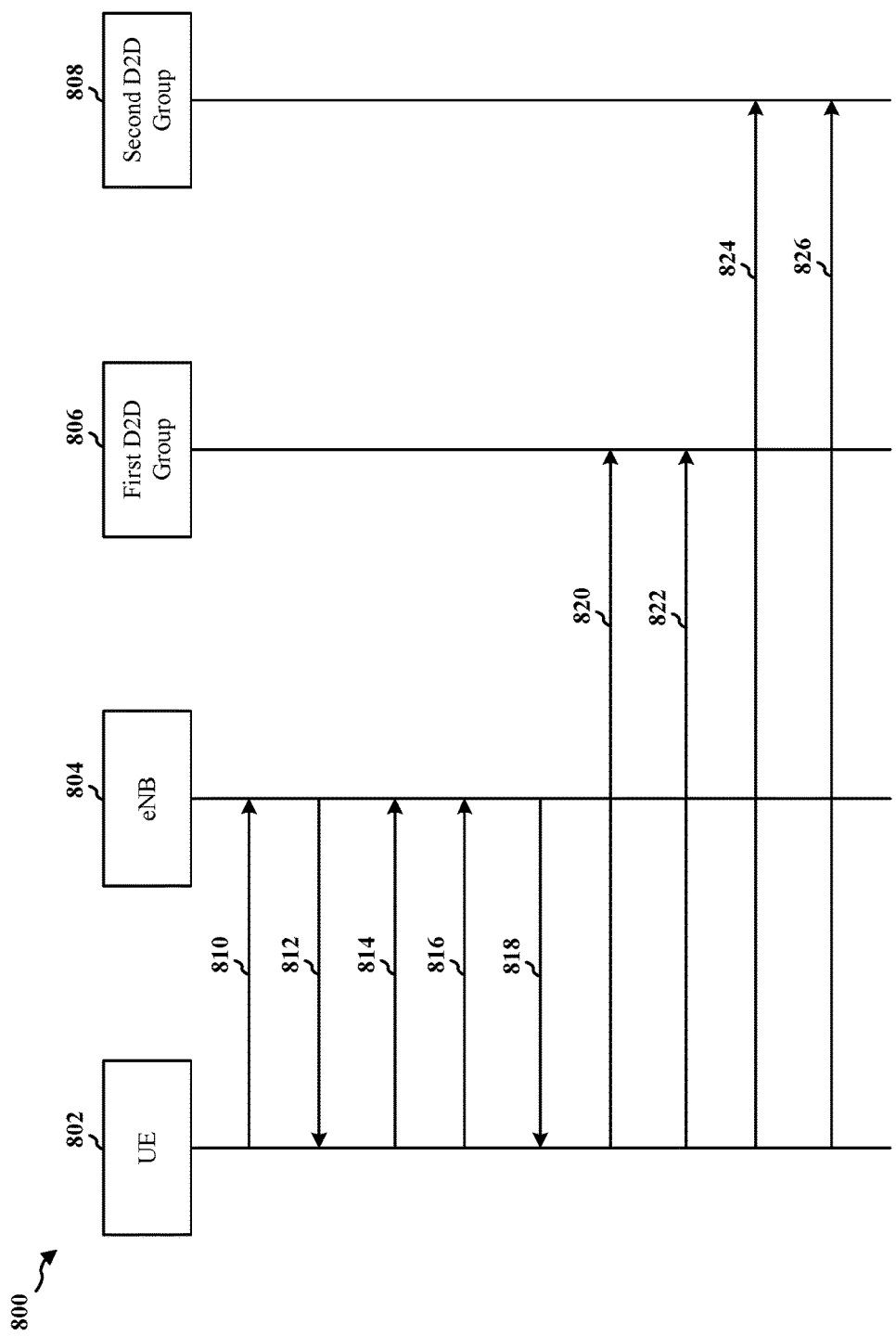
FIG. 8 is a call flow diagram illustrating an exemplary procedure for increasing a transmission power limit of a UE.

FIG. 8 is a call flow diagram 800 illustrating an exemplary procedure for increasing a transmission power limit of a UE. In FIG. 8, the UE 802 may be in an emergency situation and may want to perform D2D communication with a first D2D group 806 and a second D2D group 808 using an increased transmission power. To initiate D2D communication, the UE 802 may transmit a first message 810 to an eNB 804. In an aspect, the first message 810 may be an RRC message (e.g., the ProSeUEInformation message 732) or another type of direct communication indication message (e.g., a message transmitted over transmission control protocol (TCP)/IP). The first message 810 may indicate an intention to perform D2D communications and request D2D resources. The first message 810 may also include IDs associated with the first D2D group 806 and/or the second D2D group 808 to indicate an intention to engage in D2D communicates with the first D2D group 806 and/or the second D2D group 808. In an aspect, the first message 810 may include a D2D group ID list, and a bit for each D2D group in the group ID list may be turned on (e.g., set to 1) to indicate that the UE 802 wants to communicate with D2D groups with the bit turned on based on a status of the UE 802. The first message 810 may indicate the status of the UE 802. The status may be an emergency status that indicates whether the UE 802 is in an emergency situation or state (e.g., fire rescue, burglary in progress, need medical assistance, etc.). In an aspect, the UE 802 may determine its status based on a status selected by the user of the UE 802 (e.g., emergency status or non-emergency status). For example, if the user selects the emergency status on the UE 802, then a status indicator may be set to 1, whereas if the user does not select emergency status on the UE 802, then the status indicator may be set to 0. In another aspect, the first message 810 may request D2D communication resources based on the status of the UE 802 (e.g., the UE 802 is in an emergency situation). In an aspect, the UE 802 may have a desired transmit power with which the UE 802 wants to use for the D2D communication. In this aspect, the first message 810 may include a requested transmit power to be used for transmitting data to the first D2D group 806 and the second D2D group 808 based on the status of the UE 802. The requested transmit power may be the maximum transmission power of the UE 802, a transmission power that is greater than the currently allowed transmission power of the UE 802, or a transmission power range that is greater than a current transmission power range of the UE 802. In another aspect, the first message 810 may include a carrier frequency in which the UE 802 intends to perform the D2D communication. Including the carrier frequency in the first message 810 enables multi-carrier operation among different UEs (e.g., maximum transmit power may be used at different frequencies). In another aspect, the first message 810 may include an eNB ID (e.g., the ID of the eNB 804). In yet another aspect, the first message 810 may include a status start and stop time (e.g., an anticipated start time of the emergency and an anticipated end time of the emergency).

Upon receiving the first message 810 from the UE 802 that indicates the status of the UE 802, the eNB 804 may determine whether the UE 802 may transmit at an increased transmit power or transmit power range. In an aspect, the eNB 804 may consider the number of neighboring wireless devices within the vicinity of the UE 802 and/or the transmit power of the neighboring wireless devices in determining whether to allow the UE 802 to transmit at a greater power and at what greater transmit power (or power range). In an aspect, when the first message 810 includes a requested transmit power, the eNB 804 may determine that the requested transmit power is appropriate and allow the UE 802 to transmit at the requested transmit power. The requested transmit power may be a maximum transmission power of the UE 802. In another aspect, the eNB 804 may determine that the requested transmit power is too high (e.g., based on other devices within the vicinity) and may designate a lower allowed transmit power for the UE 802. In another aspect, the eNB 804 may determine a transmit power range for the UE 802, in which the upper limit of the transmit power range is higher than a current transmit power of the UE 802. In an aspect, the allowed transmit power may be sent in a configuration message 812 to the UE 802. In an aspect, the configuration message 812 may be a dedicated message (e.g., the RRCConnectionReconfiguration message 734). The configuration message 812 may indicate the allowed transmit power for the UE 802. In an aspect, the configuration message 812 may indicate that the allowed transmit power may be used for communicating with at least one D2D group (e.g., the first D2D group 806) associated with the UE 802. The configuration message 812 may also indicate a pool of wireless resources that may be allocated to the UE 802 for D2D communication. The configuration message 812 may also include a radio network temporary identifier (e.g., an SL-RNTI).

Upon successfully receiving the configuration message 812, the UE 802 may transmit a configuration complete message 814 to the eNB 804 indicating that the UE 802 successfully received the configuration message 812. In an aspect, the configuration complete message 814 may be the RRCConnectionReconfigurationComplete message 736.

Subsequently, when the UE 802 has data to transmit to the first D2D group 806 (and/or the second D2D group 808), the UE 802 may transmit a second message 816 to the eNB 804. The second message 816 may be, for example, a buffer status report (e.g., the ProSe BSR message 738 or another MAC control element). The second message 816 may include one or more D2D group indices, and the one or more D2D group indices may be associated with one or more D2D group IDs/D2D groups with which the UE 802 intends to communicate based on the status of the UE 802. A D2D group index may be associated with a D2D group identifier transmitted in the first message 810 (e.g., the ProSeUEInformation message 732 or another direct communication indication message). The value of the D2D group index may correspond to a position of the D2D group identifier sent by the UE 802 in the first message 810. For example, if the first message 810 included a first D2D group ID 10 (associated with the first D2D group 806) followed by a second D2D group ID 100 (associated with the second D2D group 808), the corresponding D2D group indices may be 1 and 2, respectively. D2D group index 1 may refer to D2D group ID 10 because D2D group ID 10 was the first D2D group ID listed in the first message 810. Similarly, D2D group index 2 may refer to D2D group ID 100 because D2D group ID 100 was the second D2D group ID listed in the first message 810. Although 2 D2D group IDs and indices are discussed here, any number of group IDs and D2D group indices may be used. In an aspect, in the second message 816, the UE 802 may include a set of D2D group indices that represent a subset of the D2D groups indicated in the first message 810.

Upon receiving the second message 816, the eNB 804 may determine whether to allow the UE 802 to transmit at one of a requested transmit power, a maximum transmit power of the UE 802, a transmit power designated by the eNB 804 (which may be lower than the requested transmit power or the maximum transmit power), or an allowed transmit power range. Based on the determination and the status of the UE 802 (e.g., emergency situation or non-emergency situation), the eNB 804 may transmit a downlink control information (DCI) message 818 (e.g., a DCI-5 message) to the UE 802. The DCI message 818 may include transmit power control (TPC) information determined by the eNB 804. In an aspect, the transmit power control information may be one or more TPC bits. In an example, when the TPC bit=0, the UE 802 may use open loop power control (e.g., based on a signal strength from the eNB 804, the UE 802 may figure out a pathloss between the UE 802 and the eNB 804 and calculate a transmit power to compensate for the pathloss). When the TPC bit 1=the UE 802 may transmit at an allowed power (e.g., an increased power, a maximum power) for D2D communication. In another aspect, the DCI message 818 may include a CRC scrambled with a radio network temporary identifier (e.g., SL-RNTI) that is associated with the UE 802. In another aspect, the eNB 804 may allow the UE 802 to transmit data at the maximum transmit power. In another aspect, the DCI message 818 may indicate one or more D2D groups (e.g., the first D2D group 806) to which data is to be transmitted by the UE 802 at the allowed transmit power (e.g., maximum transmit power or the requested transmit power). The DCI message 818 may also include wireless resources allocated to the UE 802 for D2D communication with the one or more D2D groups.

In an aspect, the eNB 804 may be transmitting DCI messages to other UEs. The UE 802 may determine that the DCI message 818 is intended for the UE 802 because a RNTI (e.g., SL-RNTI) used to scramble the CRC in the DCI message 818 is associated with the UE 802. The DCI message 818 may indicate that the UE 802 may transmit at the allowed transmit power (e.g., the requested transmit power or the maximum transmit power). In an aspect, the DCI message 818 may indicate an allowed transmit power that is different from the requested transmit power or the maximum transmit power. In another aspect, the allowed transmit power may be a transmit power range. Upon successfully receiving the DCI message 818, the UE 802 may transmit data based on the transmit power control information received in the DCI message 818.

In one configuration, the UE 802 may be in an emergency and may have requested resources for D2D communication resources for communicating with the first D2D group 806 and the second D2D group 808. The eNB 804 may have authorized the UE 802 to communicate with the first and second D2D groups 806, 808 using a maximum transmit power. Upon receiving the DCI message 818 the UE 802 may transmit data to the first D2D group 806 and the second D2D group 808 based on the transmit power control information in the DCI message 818 and the allowed transmit power. The UE 802 may transmit a first scheduling assignment 820 that includes the D2D group ID of the first D2D group 806 to enable to first D2D group 806 to determine that the first scheduling assignment 820 is intended for the first D2D group 806. The first scheduling assignment 820 may indicate the resource location information (e.g., time-frequency wireless resource information) for a first data set 822 to be transmitted to the first D2D group 806. The UE 802 may transmit the first data set 822 to the first D2D group 806 after transmitting the first scheduling assignment 820. UEs in the first D2D group 806 may receive the first scheduling assignment 820 and determine that the first scheduling assignment 820 is intended for the first D2D group 806 based on a D2D group ID included in the first scheduling assignment 820. The UEs in the first D2D group 806 may then receive the data in the first data set 822 based on the location information received and decoded in the first scheduling assignment 820. Similarly, the UE 802 may transmit a second scheduling assignment 824 to the second D2D group 808. The second scheduling assignment 824 may include the D2D group ID of the second D2D group 808 to enable to second D2D group 808 to determine that the second scheduling assignment 824 is intended for the second D2D group 808. The second scheduling assignment 824 may include resource location information for a second data set 826 to be transmitted to the second D2D group 808. The UE 802 may transmit the second data set 826 to the second D2D group 808 after transmitting the second scheduling assignment 824. UEs in the second D2D group 808 may receive the first scheduling assignment 820 and ignore the first scheduling assignment 820 because the D2D group ID in the first scheduling assignment 820 does not match the D2D group ID associated with the second D2D group 808. The second D2D group 808 may receive the second scheduling assignment 824 and determine that the second scheduling assignment 824 is intended for the second D2D group based on the D2D group ID included in the second scheduling assignment 824. As such, UEs in the second D2D group 808 may decode the second scheduling assignment 824 and receive the second data set 826 based on the location information in the second scheduling assignment 824.

In another configuration, when the first message 810 is transmitted over IP to a server at a core network via the eNB 804, the server (rather than the eNB 804) may authorize an increase in transmit power for the UE 802. The server may transmit the authorization to the eNB 804 for transmission to the UE 802.

In another configuration, instead of requesting a transmit power, the UE 802 may receive a designated transmit power from the eNB 804. In an aspect, the eNB 804 may transmit information to the UE 802 that indicates a maximum transmit power for one or more frequency bands utilized by the UE 802. In another aspect, the information may indicate a maximum transmit power for a type of UE (e.g., based on the brand and/or model of the UE), or a service subscription (e.g., different types of service subscriptions, such as those for police officers, firefighters, and medical personnel may provide for a different maximum transmit power). In an aspect, the information may be received in a system information block (SIB). In another aspect, the information may be received in a dedicated message (e.g., the configuration message 812). In this configuration, the UE 802 may transmit data to at least one D2D group (e.g., the first D2D group 806 and the second D2D group 808) at the maximum transmission power indicated in the information.

In another configuration, when the UE 802 moves to a new area not served by the eNB 804, the eNB 804 may perform handover procedures with respect to a target eNB serving the new area. The eNB 804 may transmit information received from the UE 802 in the first message 810 and/or the second message 816. The information may include the status of the UE 802, the transmit power control information, and/or least one of a D2D group ID (or D2D group index) associated with one or more D2D groups with which the UE 802 intends to communicate or is communicating with based on the status of the UE 802.

Figure 9:
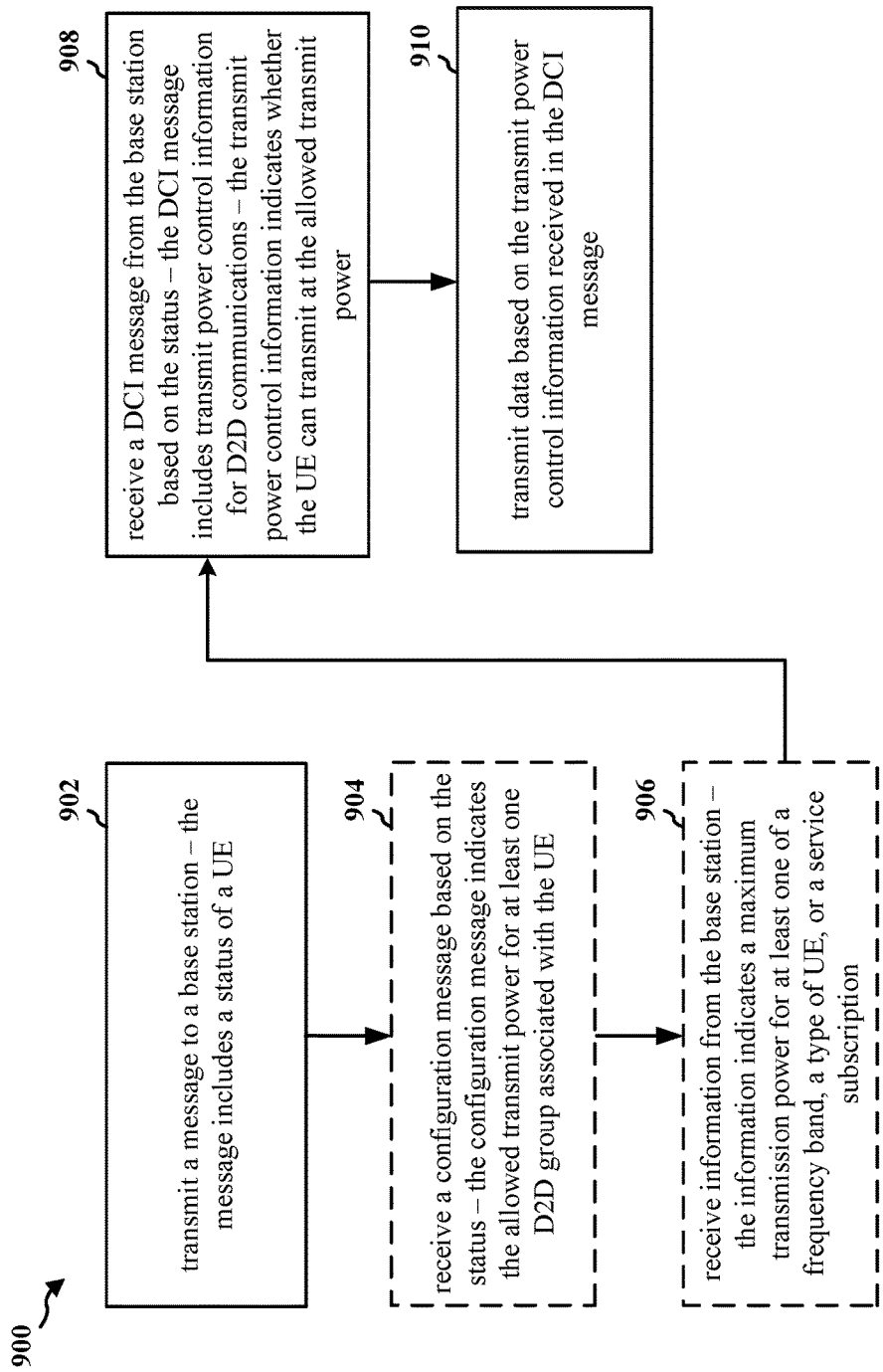
FIG. 9 is a flow chart of a method of wireless communication.

FIG. 9 is a flow chart 900 of a method of wireless communication. The method may be performed by a UE (e.g., the UE 802, the apparatus 1102/1102', infra). At 902, the UE may transmit a message to a base station. The message may include the status of the UE. In one example, referring to FIG. 8, the UE 802 may transmit the first message 810 to the eNB 804. The first message 810 may include the status of the UE 802, and the status may be an emergency status that indicates that the UE is in an emergency situation. In this example, the first message 810 may include a requested transmit power of 20 dBm. The first message 810 may also include the D2D group IDs for the first D2D group 806 and the second D2D group 808 to indicate that the UE 802 wants to communicate with the first and second D2D groups 806, 808 at 20 dBm based on the emergency status. In another example, the UE 802 may transmit the second message 816 to the eNB 804. The second message 816 may include the status of the UE 802, and the status may be an emergency status. The second message 816 may include D2D group index 1, corresponding to the first D2D group ID included in the first message 810 (e.g., the D2D group ID for the first D2D group 806). As such, the second message 816 indicates that the UE 802 wants to perform D2D communication with the first D2D group 806 at 20 dBm based on the emergency status. In yet another example, the UE 802 may transmit the first message 810 to a server at the core network via TCP/IP. The first message 810 may indicate a 20 dBm requested transmit power, an identifier associated with the eNB 804, a D2D group ID 1 associated with the first D2D group 806, a status start time of 10 PM Pacific, and a status stop time of 5 AM Pacific.

At 904, the UE may receive a configuration message based on the status. The configuration message may indicate the allowed transmit power for at least one D2D group associated with the UE. For example, referring to FIG. 8, the UE 802 may receive the configuration message 812 from the eNB 804 based on the status of the UE 802. The configuration message 812 may indicate the allowed transmit power for the UE 802 to transmit data to the first D2D group 806 and the second D2D group 808. For example, if the UE 802 requested a transmit power of 20 dBm in the first message 810, the allowed transmit power indicated in the configuration message 812 may be 20 dBm. In another aspect, the eNB 804 may allow a lesser designated transmit power (e.g., 10 dBm), or an allowed transmission power range (5 dBm to 15 dBm).

At 906, the UE may receive information from the base station. The information may indicate a maximum transmission power for at least one of a frequency band, a type of UE, or a service subscription. For example, referring to FIG. 8, the UE 802 may receive information from the eNB 804, and the information may indicate a maximum transmission power of 20 dBm for the UE 802 at a 2.5 GHz frequency band. In another example, the information may indicate a maximum transmission power of 20 dBm for the UE 802 based on the service subscription of a police officer, or a 10 dBm maximum transmission power for the UE 802 if the UE 802 has a service subscription of a traffic control officer. This information may be transmitted in a SIB. Alternatively, this information may be transmitted in a dedicated message (e.g., the configuration message 812).

At 908, the UE may receive a DCI message from the base station based on the status. The DCI message may include transmit power control information for D2D communications. The transmit power control information may indicate whether the UE can transmit at the allowed transmit power. For example, referring to FIG. 8, the UE 802 may receive the DCI message 818 (after transmitting the second message 816) based on the emergency status of the UE 802. The DCI message 818 may include transmit power control information (e.g., a TPC bit=1) that indicates that the UE 802 may transmit at an allowed transmit power (e.g., 20 dBm) based on the emergency status of the UE 802. The DCI message 818 may also include a D2D group ID, or D2D group index, associated with the first D2D group 806 to indicate that the UE 802 may transmit data at the allowed transmit power to the first D2D group 806 based on the emergency status. In another example, the allowed transmit power may be based on a SIB. For example, the eNB 804 may indicate in a SIB that all UEs within a cell served by the eNB 804 may transmit at an allowed transmit power of 15 dBm in case of emergency. As such, when the UE 802 is in an emergency status, the DCI message 818 may indicate that the UE 802 may transmit data at 15 dBm to the first D2D group 806.

At 910, the UE may transmit data based on the transmit power control information received in the DCI message. For example, referring to FIG. 8, the UE 802 may transmit data (e.g., the first scheduling assignment 820 and the first data set 822) at 20 dBm based on a TPC bit=1 in the received DCI message 818.

Figure 10:
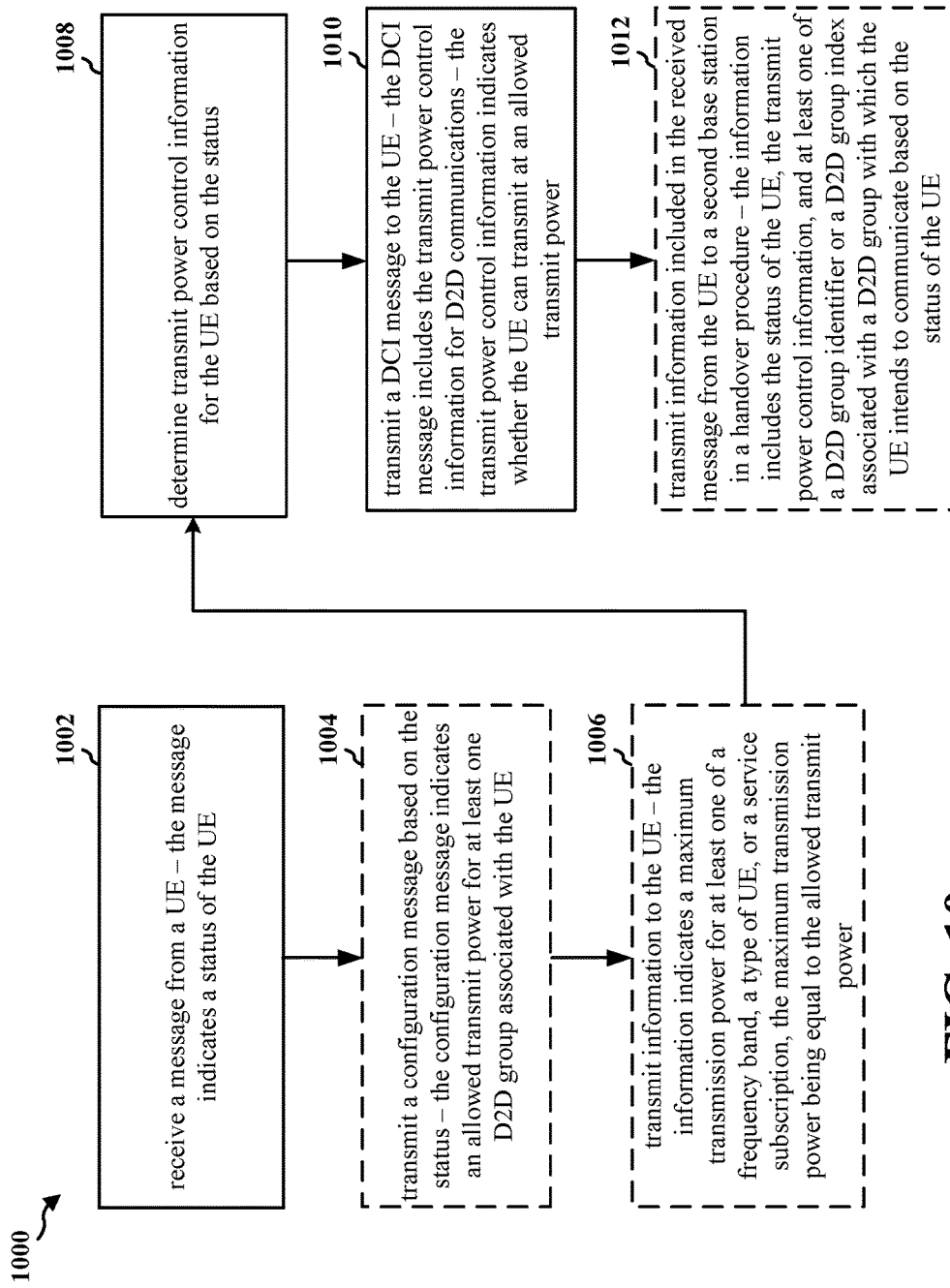
FIG. 10 is a flow chart of a method of wireless communication.

FIG. 10 is a flow chart 1000 of a method of wireless communication. The method may be performed by an eNB (e.g., the eNB 804, the apparatus 1302/1302', infra). At 1002, the eNB may receive a message from a UE. The message may indicate a status of the UE. For example, referring to FIG. 8, the eNB 804 may receive the first message 810 from the UE 802. The first message 810 may indicate an intention to perform D2D communication and may include an emergency status that indicates the UE 802 is in an emergency situation. In this example, the first message 810 may include a requested transmit power of 10 dBm. The first message 810 may also include the D2D group ID 1 associated with the first D2D group 806 to indicate that the requested transmit power is to be used by the UE 802 for transmitting data to the first D2D group 806 based on the emergency status of the UE 802. In another example, the eNB 804 may receive the second message 816 from the UE 802, and the second message may include an emergency status that indicates that the UE 802 is in an emergency situation. The second message 816 may include a requested transmit power of 10 dBm. The second message 816 may include the D2D group index 1 associated with the D2D group ID 1 for the first D2D group 806 to indicate that the requested transmit power is to be used by the UE 802 for transmitting data to the first D2D group 806 based on the emergency status of the UE 802.

At 1004, the eNB may transmit a configuration message to the UE based on the status of the UE. The configuration message may indicate the allowed transmit power for at least one D2D group associated with the UE. For example, referring to FIG. 2, the eNB 804 may transmit a configuration message 812 to the UE 802 based on the UE 802 being in an emergency situation. The configuration message 812 may indicate that the allowed transmit power is 10 dBm, which is the same as the requested transmit power from the UE 802 in the first message 810. In another example, the allowed transmit power may be a maximum transmit power of the UE 802 (e.g., 23 dBm), a designated transmit power (e.g., 5 dBm), or an allowed transmission power range (10 dBm-20 dBm). As such, the allowed transmit power may be different from the requested transmit power.

At 1006, the eNB may transmit information to the UE. The information may indicate a maximum transmission power for at least one of a frequency band, a type of UE, or a service subscription. The maximum transmission power may be equal to the allowed transmit power. For example, referring to FIG. 8, the eNB 804 may transmit information to the UE 802, and the information may indicate a maximum transmission power of 20 dBm for the UE 802 at a 2.5 GHz frequency band. In another example, the information may indicate a maximum transmission power of 20 dBm for the UE 802 based on the service subscription of a police officer, or a 10 dBm maximum transmission power for the UE 802 if the UE 802 has a service subscription of a traffic control officer. This information may be transmitted in a SIB. Alternatively, this information may be transmitted in a dedicated message (e.g., the configuration message 812).

At 1008, the eNB may determine transmit power control information for the UE based on the status. For example, referring to FIG. 8, upon receiving the second message 816, the eNB 804 may determine transmit power control information for the UE 802 based on the status of the UE 802. If the status indicates that the UE 802 is not in an emergency situation, the eNB 804 may set the TPC bit to 0. On the other hand, if the status of the UE indicates that the UE 802 is in an emergency situation, the eNB 804 may set the TPC bit to 1, if the eNB 804 determines that the UE 802 may increase transmission power.

At 1010, the eNB may transmit a DCI message to the UE. The DCI message may include the transmit power control information for D2D communications. The transmit power control information may indicate whether the UE can transmit at an allowed transmit power. For example, referring to FIG. 8, the eNB 804 may transmit a DCI message 818 to the UE 802. The DCI message 818 may include the transmit power control information for D2D communication. In this example, the transmit power control information may be a TPC bit. The TPC bit may be set to 1, indicating that the UE 802 can transmit at an allowed power. In this example, the allowed power may be equal to the requested transmit power requested by the UE 802 in either the first message 810 and/or the second message 816. The DCI message 818 also includes a D2D group ID 1 associated with the first D2D group 806 or a D2D group index 1 associated with the first D2D group 806.

At 1012, the eNB may transmit information included in the received message from the UE to a second base station in a handover procedure. The information may include the status of the UE, the transmit power control information, and at least one of a D2D group identifier or a D2D group index associated with a D2D group with which the UE intends to communicate based on the status of the UE. For example, referring to FIG. 8, the eNB 804 may transmit information included in the second message 816 (or the first message 810) from the UE 802 to a second eNB (not pictured in FIG. 8) in a handover procedure. The information may indicate that the UE 802 is in an emergency situation and the TPC bit is equal to 1. The information may include D2D group indices 1, 2 associated with the first D2D group 806 and the second D2D group 808, respectively. The information may include an allowed transmit power for communicating with the first D2D group 806 and the second D2D group 808 based on the emergency status of the UE 802.

Figure 11:
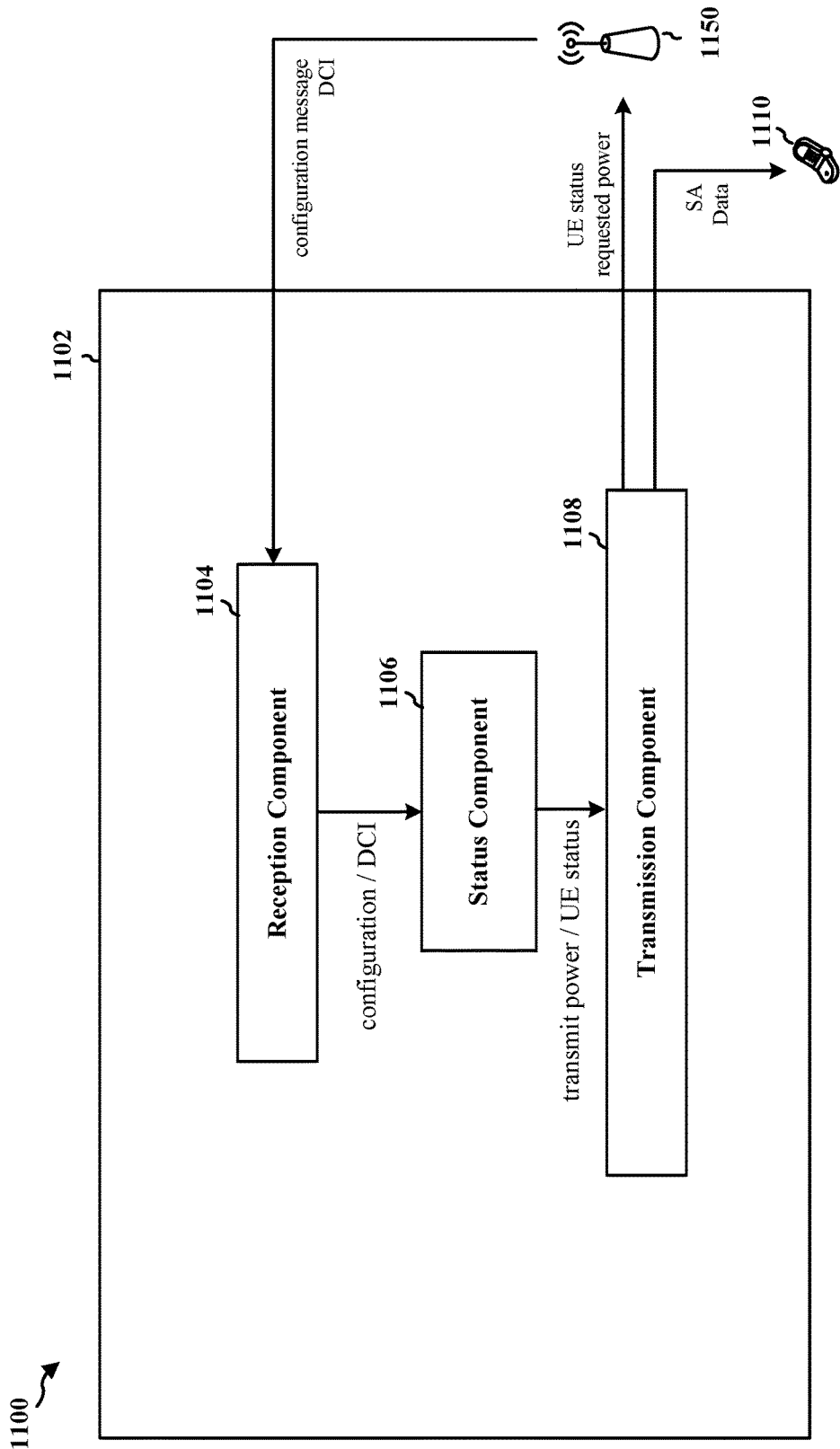
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a reception component 1104, a status component 1106, and a transmission component 1108. The transmission component 1108 may be configured to transmit a message to a base station 1150. The message may include a status of the apparatus provided by the status component 1106. In an aspect, the status may be an emergency status that indicates whether the apparatus is in an emergency situation. In another aspect, the message may include a requested transmit power to be used for transmitting data to at least one D2D group based on the status of the apparatus. The reception component 1104 may be configured to receive a DCI message from the base station 1150 based on the status. The DCI message may include transmit power control information for D2D communications. The transmit power control information may indicate whether the apparatus can transmit at an allowed transmit power. In an aspect, the allowed transmit power may include one of a maximum transmission power of the apparatus, a designated transmission power, or an allowed transmission power range. In another aspect, the DCI message may indicate at least one D2D group to which data is to be transmitted by the apparatus at the allowed transmit power. In one configuration, the message may indicate an intention to perform D2D communications. In this configuration, the message may indicate at least one D2D group with which the apparatus intends to communicate based on the status of the apparatus. In this configuration, the reception component 1104 may be configured to receive a configuration message based on the status. The configuration message may indicate the allowed transmit power for at least one D2D group associated with the apparatus. The reception component 1104 may be configured to provide the contents of the DCI message to the status component 1106. In an aspect, the allowed transmit power may be different from the requested transmit power. In another configuration, the message may include a buffer status report and a D2D group index. The D2D group index may be associated with a D2D group identifier and correspond to a position of the D2D group identifier included in a direct communication indication message (e.g., the first message 810) transmitted by the apparatus. The D2D group identifier may be associated with a D2D group with which the apparatus intends to communicate based on the status of the apparatus. In another configuration, the reception component 1104 may be configured to receive information from the base station 1150. The information may indicate a maximum transmission power for at least one of a frequency band, a type of apparatus, or a service subscription, the maximum transmission power being equal to the allowed transmit power. In an aspect, the information may be received in a SIB or a dedicated message. The reception component 1104 may be configured to provide the information to the status component 1106. The transmission component 1108 may be configured to transmit data to at least one D2D group 1110 based on the transmit power control information received in the DCI message. The transmission component 1108 may be configured to transmit data based on an allowed transmit power provided by the status component 1106. In an aspect, the transmission component 1108 may transmit data based on the transmit power control information and the apparatus status. In another aspect, the message may include at least one of a requested transmit power, a base station identifier, a D2D group identifier, a status start time, or a status stop time.

The apparatus may include additional components that perform each of the blocks of the algorithm in the aforementioned flow charts of FIG. 9. As such, each block in the aforementioned flow charts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
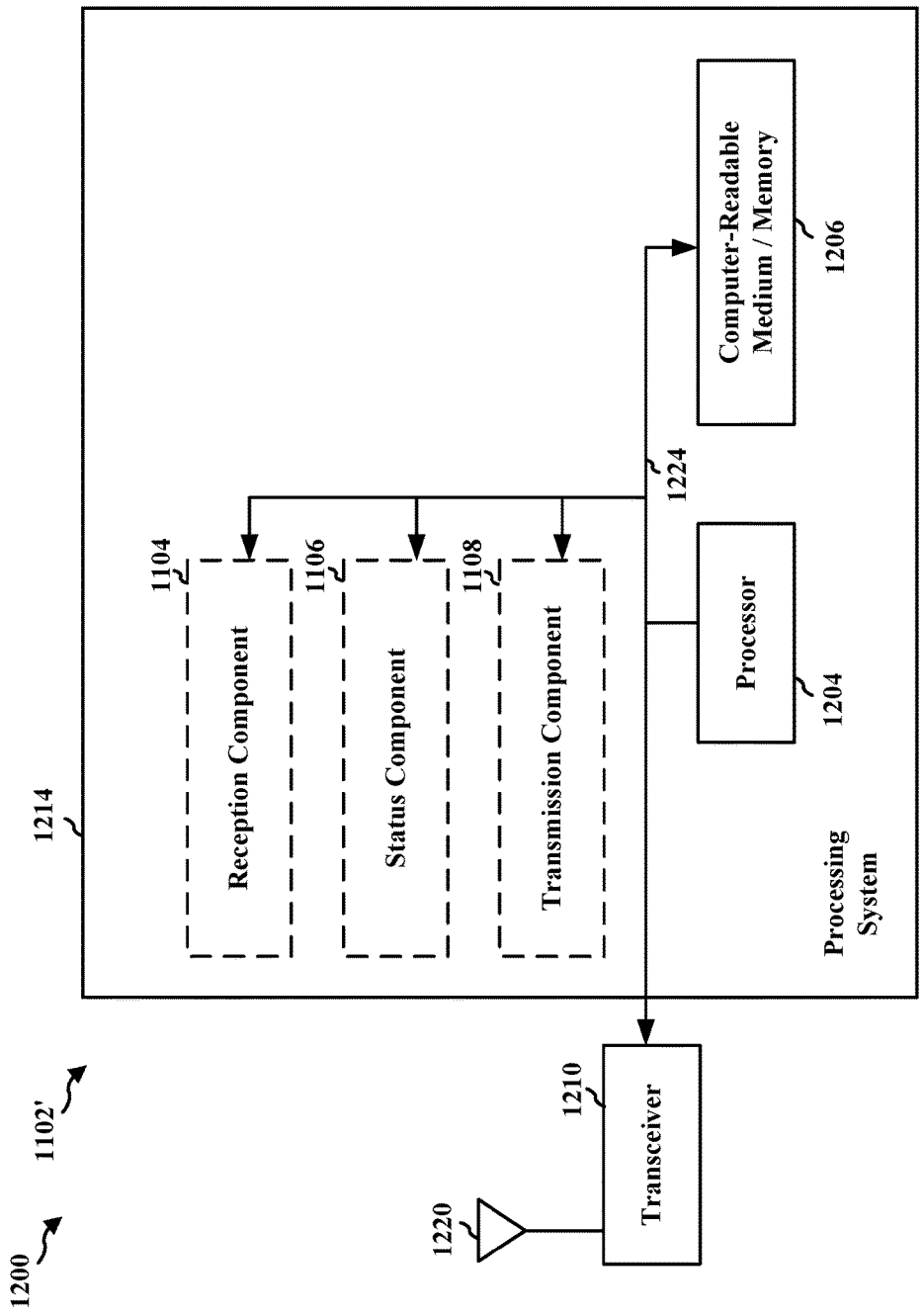
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the components 1104, 1106, 1108. The components may be software components running in the processor 1204, resident/stored in the computer readable medium/memory 1206, one or more hardware components coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for transmitting a message to a base station. The message may include a status of the apparatus. The apparatus may include means for receiving a DCI message from the base station based on the status. The DCI message may include transmit power control information for D2D communications. The transmit power control information may indicate whether the apparatus can transmit at an allowed transmit power. The apparatus may include means for transmitting data based on the transmit power control information received in the DCI message. In aspect, the status may be an emergency status that indicates whether the apparatus is in an emergency situation. In another aspect, the allowed transmit power may include one of a maximum transmission power of the apparatus, a designated transmission power, or an allowed transmission power range. In another aspect, the message may include a requested transmit power to be used for transmitting data to at least one D2D group based on the status of the apparatus. In another aspect, the DCI message may indicate at least one D2D group to which data is to be transmitted by the apparatus at the allowed transmit power. In another aspect, the message may indicate an intention to perform D2D communications. In another aspect, the message may indicate at least one D2D group with which the apparatus intends to communicate based on the status of the apparatus. In another configuration, the apparatus may include means for receiving a configuration message based on the status. The configuration message may indicate the allowed transmit power for at least one D2D group associated with the apparatus. In this configuration, data may be transmitted based on the transmit power control information and the allowed transmit power. In another aspect, the allowed transmit power may be different from the requested transmit power. In another aspect, the message may include a buffer status report and a D2D group index. The D2D group index may be associated with a D2D group identifier and correspond to a position of the D2D group identifier included in a direct communication indication message (e.g., the first message 810) transmitted by the apparatus. The D2D group identifier may be associated with a D2D group with which the apparatus intends to communicate based on the status of the apparatus. In another configuration, the apparatus may include means for receiving information from the base station. The information may indicate a maximum transmission power for at least one of a frequency band, a type of apparatus, or a service subscription, and the maximum transmission power may be equal to the allowed transmit power. In another aspect, the information may be received in a system information block or in a dedicated message. In yet another aspect, the data may be transmitted to at least one D2D group at the maximum transmission power indicated in the received information. In another aspect, the message may include at least one of a requested transmit power, a base station identifier, a D2D group identifier, a status start time, or a status stop time. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 13:
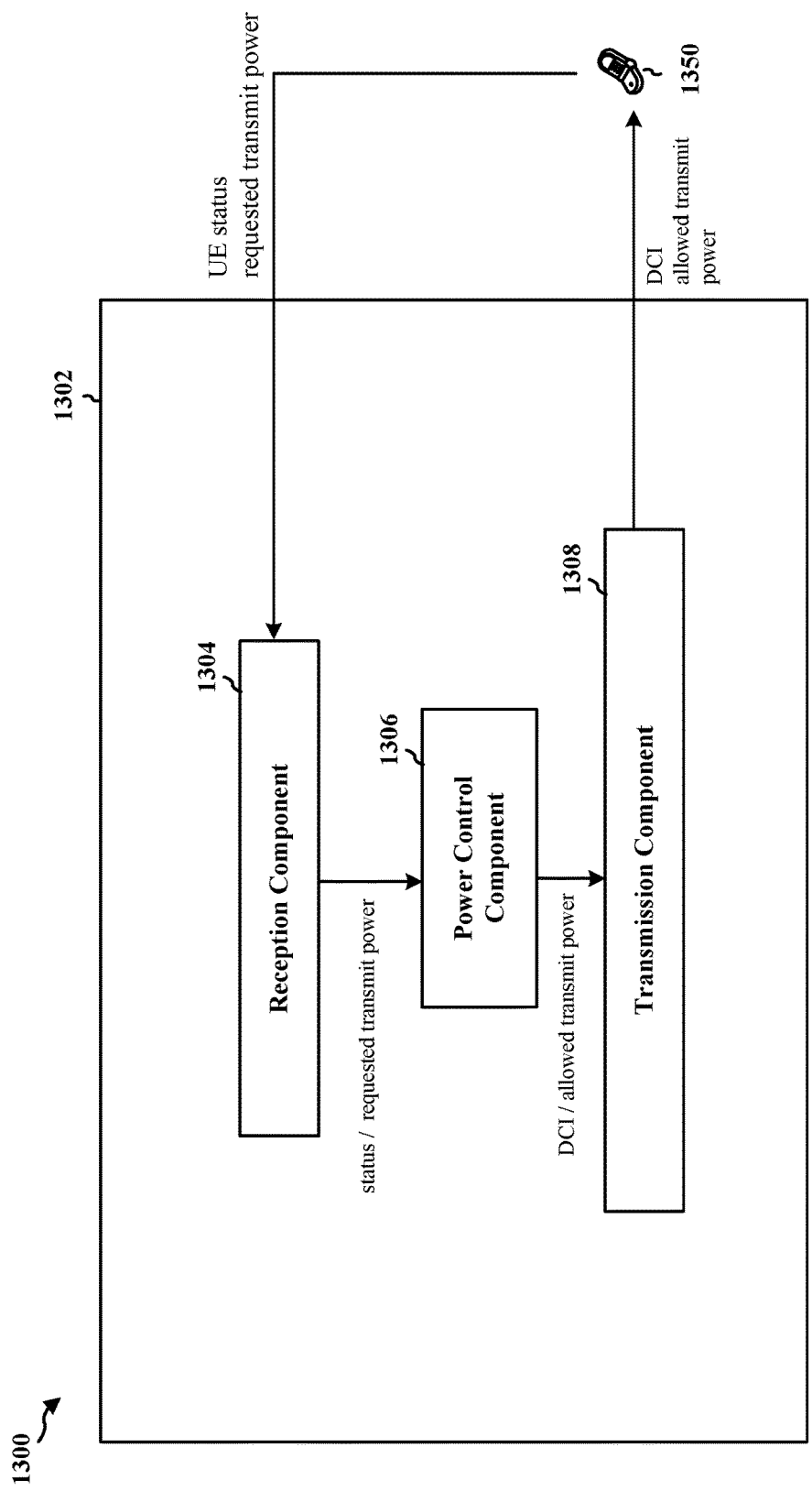
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be an eNB. The apparatus may include a reception component 1304, a power control component 1306, and a transmission component 1308. The reception component 1304 may be configured to receive a message from a UE 1350, in which the message indicates a status of the UE 1350. The reception component 1304 may provide the status information to the power control component 1306, and the power control component 1306 may be configured to determine transmit power control information for the UE based on the status and determine an allowed transmit power for the UE 1350. The power control component 1306 may provide the transmit power control information, the allowed transmit power, and other DCI information to the transmission component 1308. The transmission component 1308 may be configured to transmit a DCI message to the UE 1350. The DCI message may includes the transmit power control information for D2D communications. The transmit power control information may indicate whether the UE can transmit at an allowed transmit power. In an aspect, the status may be an emergency status that indicates whether the UE 1350 is in an emergency situation. In another aspect, the allowed transmit power may include one of a maximum transmission power of the UE 1350, a designated transmission power, or an allowed transmission power range. In another aspect, the message may include a requested transmit power to be used by the UE 1350 for transmitting data to at least one D2D group based on the status of the UE 1350. In another aspect, the DCI message may indicate at least one D2D group to which data is to be transmitted by the UE 1350 at the allowed transmit power. In another aspect, the message may indicate an intention to perform D2D communications. In another aspect, the message may indicate at least one D2D group with which the UE 1350 intends to communicate based on the status of the UE 1350. In another configuration, the transmission component 1308 may be configured to transmit a configuration message based on the status. The configuration message may indicate the allowed transmit power for at least one D2D group associated with the UE 1350. In this configuration, the allowed transmit power may be different from the requested transmit power. In another configuration, the message may include a buffer status report and a D2D group index. The D2D group index may be associated with a D2D group identifier and may correspond to a position of the D2D group identifier included in a direct communication indication message (e.g., the first message 810) received from the UE 1350. The D2D group identifier may be associated with a D2D group with which the UE intends to communicate based on the status of the UE 1350. In another configuration, the transmission component 1308 may be configured to transmit information to the UE. The information may indicate a maximum transmission power for at least one of a frequency band, a type of UE, or a service subscription, and the maximum transmission power may be equal to the allowed transmit power. In another aspect, the information may be transmitted in a system information block or in a dedicated message. In another aspect, the message may include at least one of a requested transmit power, a base station identifier, a D2D group identifier, a status start time, or a status stop time. In another configuration, the transmission component 1308 may be configured to transmit information included in the received message from the UE 1350 to a second base station in a handover procedure. The information may include the status of the UE, the transmit power control information, and at least one of a D2D group identifier or a D2D group index associated with a D2D group with which the UE 1350 intends to communicate based on the status of the UE 1350.

The apparatus may include additional components that perform each of the blocks of the algorithm in the aforementioned flow charts of FIG. 10. As such, each block in the aforementioned flow charts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
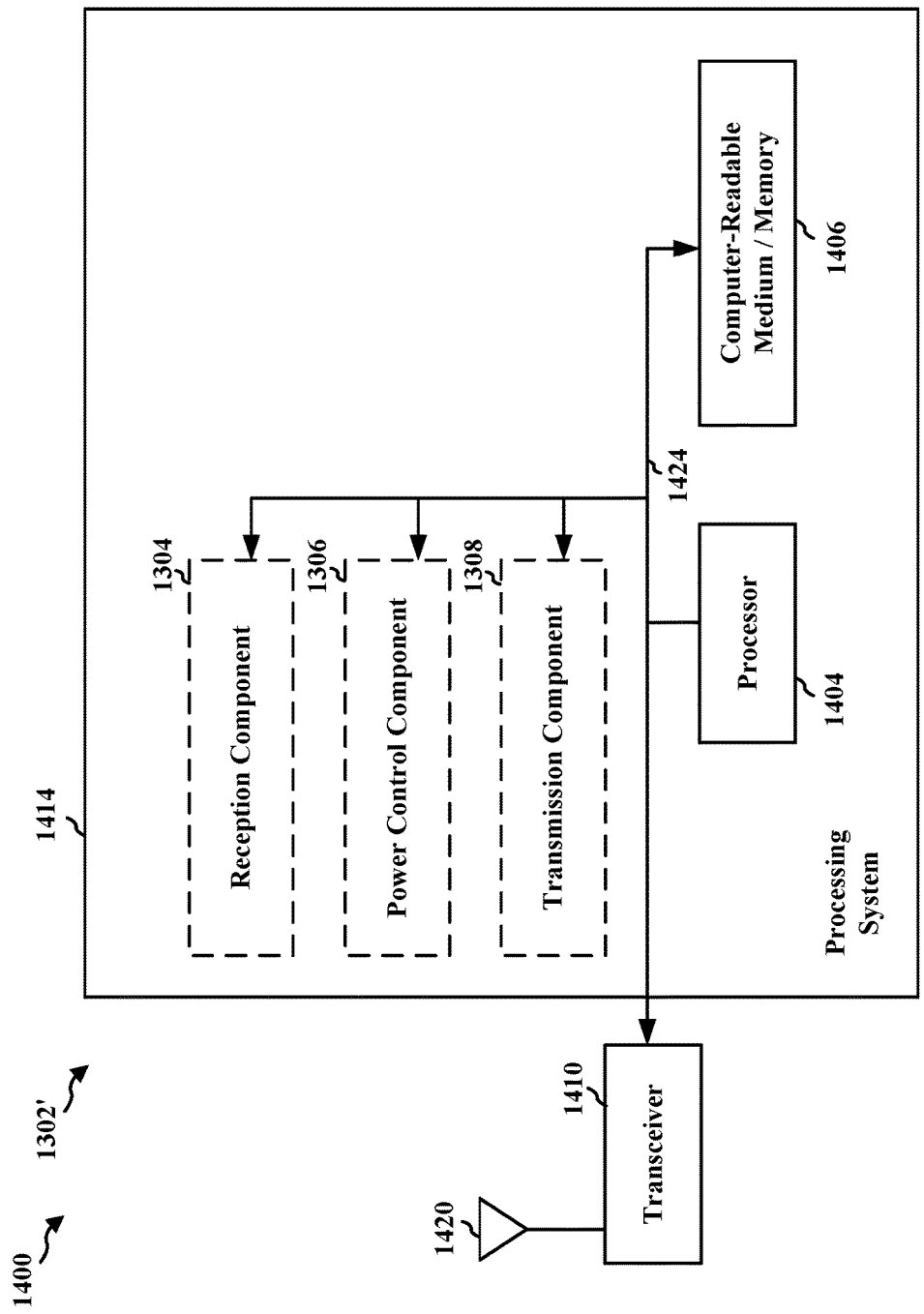
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the components 1304, 1306, and 1308. The components may be software components running in the processor 1404, resident/stored in the computer readable medium/memory 1406, one or more hardware components coupled to the processor 1404, or some combination thereof. The processing system 1414 may be a component of the eNB 610 and may include the memory 676 and/or at least one of the TX processor 616, the RX processor 670, and the controller/processor 675.

In one configuration, the apparatus 1302/1302' for wireless communication includes means for receiving a message from a UE. The message may indicate a status of the UE. The apparatus may include means for determining transmit power control information for the UE based on the status. The apparatus may include means for transmit a DCI message to the UE. The DCI message may include the transmit power control information for D2D communications. The transmit power control information may indicate whether the UE can transmit at an allowed transmit power. In an aspect, the status may be an emergency status that indicates whether the UE is in an emergency situation. In another aspect, the allowed transmit power may include one of a maximum transmission power of the UE, a designated transmission power, or an allowed transmission power range. In another aspect, the message may include a requested transmit power to be used by the UE for transmitting data to at least one D2D group based on the status of the UE. In another aspect, the DCI message may indicate at least one D2D group to which data is to be transmitted by the UE at the allowed transmit power. In another aspect, the message may indicate an intention to perform D2D communications. In another aspect, the message may indicate at least one D2D group with which the UE intends to communicate based on the status of the UE. In another configuration, the apparatus may include means for transmitting a configuration message based on the status. The configuration message may indicate the allowed transmit power for at least one D2D group associated with the UE. In an aspect, the allowed transmit power may be different from the requested transmit power. In another aspect, the message include a buffer status report and a D2D group index. The D2D group index may be associated with a D2D group identifier and correspond to a position of the D2D group identifier included in a direct communication indication message received from the UE. The D2D group identifier may be associated with a D2D group with which the UE intends to communicate based on the status of the UE. The apparatus may include means for transmitting information to the UE. The information may indicate a maximum transmission power for at least one of a frequency band, a type of UE, or a service subscription. The maximum transmission power may be equal to the allowed transmit power. In an aspect, the information may be transmitted in a system information block or in a dedicated message. In another aspect, the message may include at least one of a requested transmit power, a base station identifier, a D2D group identifier, a status start time, or a status stop time. In another configuration, the apparatus may include means for transmitting information included in the received message from the UE to a second base station in a handover procedure. The information may include the status of the UE, the transmit power control information, and at least one of a D2D group identifier or a D2D group index associated with a D2D group with which the UE intends to communicate based on the status of the UE. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
    transmitting a message to a base station, wherein the message includes an emergency status of the UE that indicates whether the UE is in an emergency situation, at least one device-to-device (D2D) group, and a requested transmit power to be used for transmitting data from the UE to the at least one D2D group when the UE is in the emergency situation;
    receiving a downlink control information (DCI) message from the base station based on the status, wherein the DCI message includes transmit power control information for D2D communications, wherein the transmit power control information indicates whether the UE can transmit at an allowed transmit power, and wherein the allowed transmit power comprises one of the requested transmit power or a transmit power that is lower than the requested transmit power or lower than a maximum transmission power of the UE; and
    transmitting the data to the at least one D2D group based on the transmit power control information received in the DCI message.

2. The method of claim 1, wherein the allowed transmit power further comprises one of the maximum transmission power of the UE, or an allowed transmission power range.

3. The method of claim 1, wherein the message indicates an intention to perform D2D communications.

4. The method of claim 3, wherein the message indicates the at least one D2D group with which the UE intends to communicate based on the status of the UE.

5. The method of claim 1, further comprising:
    receiving a configuration message based on the status, wherein the configuration message indicates the allowed transmit power for the at least one D2D group associated with the UE, wherein the data is transmitted based on the transmit power control information and the allowed transmit power.

6. The method of claim 5, wherein the allowed transmit power is different from the requested transmit power.

7. The method of claim 1, further comprising:
    receiving information from the base station, wherein the information indicates a maximum transmission power for at least one of a frequency band, a type of UE, or a service subscription, the maximum transmission power being equal to the allowed transmit power.

8. The method of claim 7, wherein the information is received in a system information block or in a dedicated message.

9. The method of claim 1, wherein the data is transmitted to the at least one D2D group at the allowed transmission power.

10. The method of claim 1, wherein the message further includes at least one of a base station identifier, a D2D group identifier, a status start time, or a status stop time.

11. The method of claim 1, wherein the DCI message further indicates the at least one D2D group to which the data is to be transmitted by the UE at the allowed transmit power.

12. A method of wireless communication by a user equipment (UE), comprising:
    transmitting a message to a base station, wherein the message includes a status of the UE, a buffer status report and a device-to-device (D2D) group index, wherein the D2D group index is associated with a D2D group identifier and a value of the D2D group index corresponds to a position of the D2D group identifier included in a direct communication indication message transmitted by the UE, and wherein the D2D group identifier is associated with a D2D group with which the UE intends to communicate based on the status of the UE;
    receiving, by the UE, a downlink control information (DCI) message from the base station based on the status, wherein the DCI message includes transmit power control information for D2D communications, and wherein the transmit power control information indicates whether the UE can transmit at an allowed transmit power; and transmitting data based on the transmit power control information received in the DCI message.

13. An apparatus for wireless communication, comprising:
means for transmitting a message to a base station, wherein the message includes an emergency status of the apparatus the indicates whether the apparatus is in an emergency situation, at least one device-to-device (D2D) group, and a requested transmit power to be used for transmitting data from the apparatus to the at least one D2D group when the apparatus is in the emergency situation;
means for receiving a downlink control information (DCI) message from the base station based on the status, wherein the DCI message includes transmit power control information for D2D communications, wherein the transmit power control information indicates whether the apparatus can transmit at an allowed transmit power, and wherein the allowed transmit power comprises one of the requested transmit power or a transmit power that is lower than the requested transmit power or lower than a maximum transmission power of the apparatus; and
means for transmitting the data to the at least one D2D group based on the transmit power control information received in the DCI message.

14. An apparatus for wireless communication, comprising:
a memory; and
at least one processor coupled to the memory and configured to:
transmit a message to a base station, wherein the message includes an emergency status of the apparatus that indicates whether the apparatus is in an emergency situation, at least one device-to-device (D2D) group, and a requested transmit power to be used for transmitting data from the apparatus to the at least one D2D group when the apparatus is in the emergency situation;
receive a downlink control information (DCI) message from the base station based on the status, wherein the DCI message includes transmit power control information for D2D communications, wherein the transmit power control information indicates whether the apparatus can transmit at an allowed transmit power, and wherein the allowed transmit power comprises one of the requested transmit power or a transmit power that is lower than the requested transmit power or lower than a maximum transmission power of the apparatus; and
transmit the data to the at least one D2D group based on the transmit power control information received in the DCI message.

15. The apparatus of claim 14, wherein the allowed transmit power further comprises one of the maximum transmission power of the apparatus, a designated transmission power, or an allowed transmission power range.

16. The apparatus of claim 14, wherein the message indicates an intention to perform D2D communications.

17. The apparatus of claim 16, wherein the message indicates the at least one D2D group with which the apparatus intends to communicate based on the status of the apparatus.

18. The apparatus of claim 14, wherein the at least one processor is further configured to:
receive a configuration message based on the status, wherein the configuration message indicates the allowed transmit power for the at least one D2D group associated with the apparatus, wherein the data is transmitted based on the transmit power control information and the allowed transmit power.

19. The apparatus of claim 18, wherein the allowed transmit power is different from the requested transmit power.

20. The apparatus of claim 14, wherein the at least one processor is further configured to:
receive information from the base station, wherein the information indicates a maximum transmission power for at least one of a frequency band, a type of apparatus, or a service subscription, the maximum transmission power being equal to the allowed transmit power.

21. The apparatus of claim 20, wherein the information is received in a system information block or in a dedicated message.

22. The apparatus of claim 14, wherein the data is transmitted to the at least one D2D group at the allowed transmission power.

23. The apparatus of claim 14, wherein the message further includes at least one of a base station identifier, a D2D group identifier, a status start time, or a status stop time.

24. The apparatus of claim 14, wherein the DCI message further indicates the at least one D2D group to which the data is to be transmitted by the apparatus at the allowed transmit power.

25. An apparatus for wireless communication, comprising:
a memory; and
at least one processor coupled to the memory and configured to:
transmit a message to a base station, wherein the message includes a status of the apparatus, a buffer status report and a D2D group index, wherein the D2D group index is associated with a D2D group identifier and a value of the D2D group index corresponds to a position of the D2D group identifier included in a direct communication indication message transmitted by the apparatus, and wherein the D2D group identifier is associated with a D2D group with which the apparatus intends to communicate based on the status of the apparatus;
receive, by the apparatus, a downlink control information (DCI) message from the base station based on the status, wherein the DCI message includes transmit power control information for device-to-device (D2D) communications, and wherein the transmit power control information indicates whether the apparatus can transmit at an allowed transmit power; and
transmit data based on the transmit power control information received in the DCI message.

26. A non-transitory computer-readable medium of a user equipment (UE) storing computer executable code for wireless communication, comprising code for:
transmitting a message to a base station, wherein the message includes an emergency status of the UE that indicates whether the UE is in an emergency situation, at least one device-to-device (D2D) group, and a requested transmit power to be used for transmitting data from the UE to at least one D2D group when the UE is in the emergency situation;

receiving a downlink control information (DCI) message from the base station based on the status, wherein the DCI message includes transmit power control information for device-to-device (D2D) communications, wherein the transmit power control information indicates whether the UE can transmit at an allowed transmit power, and wherein the allowed transmit power comprises one of the requested transmit power or a transmit power that is lower than the requested transmit power or lower than a maximum transmission power of the UE; and transmitting the data to the at least one D2D group based on the transmit power control information received in the DCI message.

* * * * *